(12) United States Patent
Villoria

(10) Patent No.: US 10,293,255 B2
(45) Date of Patent: May 21, 2019

(54) COMPUTER SYSTEM MANAGING MULTI-USER REWARDS

(71) Applicant: KING.COM LIMITED, St. Julians (MT)

(72) Inventor: Marc Garcia Villoria, Barcelona (ES)

(73) Assignee: KING.COM LTD., St. Julians (MT)

(*) Notice: Subject to any disclaimer, the term of this patent is extended or adjusted under 35 U.S.C. 154(b) by 310 days.

(21) Appl. No.: 14/689,887

(22) Filed: Apr. 17, 2015

(65) Prior Publication Data
US 2015/0298004 A1 Oct. 22, 2015

(30) Foreign Application Priority Data
Apr. 17, 2014 (GB) .................................. 1406962.9

(51) Int. Cl.
| A63F 13/52 | (2014.01) |
| A63F 13/46 | (2014.01) |
| A63F 13/44 | (2014.01) |
| A63F 13/35 | (2014.01) |

(52) U.S. Cl.
CPC ............ *A63F 13/52* (2014.09); *A63F 13/44* (2014.09); *A63F 13/46* (2014.09); *A63F 13/35* (2014.09); *A63F 2300/575* (2013.01)

(58) Field of Classification Search
CPC .................................................... A63F 13/52
See application file for complete search history.

(56) References Cited

U.S. PATENT DOCUMENTS

| 6,582,307 B2* | 6/2003 | Webb ................. G07F 17/3202 463/20 |
| 2005/0043075 A1* | 2/2005 | Lin ........................ A63F 13/10 463/9 |
| 2005/0064933 A1* | 3/2005 | Davis ..................... G07F 17/32 463/20 |
| 2008/0153570 A1* | 6/2008 | Esses .................. G07F 17/3295 463/20 |
| 2009/0117970 A1* | 5/2009 | De Waal ................. G07F 17/32 463/20 |
| 2012/0083329 A1* | 4/2012 | Rommerdahl .......... G07F 17/32 463/20 |
| 2012/0289322 A1* | 11/2012 | Causley .............. G07F 17/3269 463/26 |
| 2013/0331162 A1* | 12/2013 | Krivicich ............ G06F 3/04812 463/10 |
| 2014/0087879 A1* | 3/2014 | Basallo ................. G07F 17/326 463/37 |

OTHER PUBLICATIONS

Candy Crush Saga Walkthrough—Martijn Mueller, Apr. 18, 2012, pp. 1-13.*
https://www.youtube.com/watch?v=8TIeNDnJiN8, Candy Crush Saga Gameplay First Look (Episode 1-10 Levels), Published online Apr. 15, 2012, OGL Gameplays; viewed online Mar. 5, 2018.*

* cited by examiner

*Primary Examiner* — Omkar A Deodhar
*Assistant Examiner* — Shauna-Kay Hall
(74) *Attorney, Agent, or Firm* — Saul Ewing Arnstein & Lehr LLP

(57) ABSTRACT

A computer implemented method is performed in a device. One or more first game objects is displayed. In response to user input one or more collectable game objects, are accumulated. It is determined if a number of accumulated collectable game objects has reached a predetermined value, and if not, a further set of first game objects is displayed only if a game level has been played.

26 Claims, 19 Drawing Sheets

COMPUTER SYSTEM MANAGING MULTI-USER REWARDS

CROSS-REFERENCE TO RELATED APPLICATION

This application is based on and claims priority to British Application No. GB1406962.9, filed Apr. 17, 2014, the entire contents of which are fully incorporated herein by reference.

FIELD OF THE INVENTION

Some embodiments may relate to a system for providing a computer implemented game having a plurality of game objects which in use are displayed on a display.

BACKGROUND OF TH INVENTION

There are many technical challenges and technical considerations facing the designer of computer games executed on devices having a user interface, such as designing a controllable user interface in the context of available computer devices and resources, which may be limited.

These problems can be particularly marked in the context of computer games, where a screen may have to display many different game components for active engagement by a player.

Many games are downloaded from a remote server over the internet and then stored on a user device. A technical challenge in the context of computer games can involve enabling a game to be fun, accessible and compelling even when there is limited bandwidth available. This may especially be the case when a high speed internet connection is not available such as when a game is being played on a smartphone or tablet without Wi-Fi access. Another significant challenge is that of user engagement. Engagement involves designing gameplay to be engaging and rewarding to players. This typically requires games to be easily understood at their simplest or introductory levels, providing rewarding gameplay with simple to complex game mechanics, and becoming progressively more challenging so that players are not bored, but remain engaged and develop rewarding skills.

The contemporary online environment presents to game developers a large number of input parameters that may be used to determine game functions and control the behaviour of objects displayed on a user interface. For example, social networking websites, such as Facebook, allow game apps to automatically retrieve information about players and other users of the social network to automatically alter the gameplay characteristics on the basis of this retrieved information. How to translate this sea of available information into useful input parameters to develop engaging games is a further technical challenge.

There are therefore many technical challenges when designing computer implemented games, particularly in providing a challenge to a user or player that is engaging and rewarding so as to provoke repeat play. This may, but not exclusively, apply to "casual games".

SUMMARY OF THE INVENTION

According to a first aspect there is a computer implemented method, the method comprising the following implemented by at least one processor and at least one memory of a device: displaying on a display of the device one or more first game objects; in response to user input via a user interface of the device, accumulating one or more collectable game object, said collectable game objects comprising or associated with said first game objects; determining if a number of said collectable game objects accumulated has reached a predetermined value, and if so: displaying on said display a further set of one or more of said first game objects only if at least one game condition is satisfied.

In one embodiment, said one or more first game objects comprise one or more activatable game objects.

In one embodiment, said one or more first game objects comprise one or more activatable game objects.

In one embodiment, said first game objects are displayed in response to user input associated with a set of further game objects.

In one embodiment, said at least one game condition is satisfied if a user has played a level of the game since the number of said collectable game objects accumulated reached said predetermined value.

In one embodiment, in dependence upon the value of a first parameter a collectable game object of said collectable game objects is accumulated at a first time point.

In one embodiment, determining a second time point at which the user last played a level of the game; and in response to said user input via said user interface of the device, modifying the value of said first parameter in dependence upon a comparison between the first time point and the second time point. In one embodiment, in response to said user input via said user interface, the value of the first parameter remains unmodified if the first time point is later than the second time point.

In one embodiment, in response to said user input via said user interface, the value of the first parameter increases if the first time point is earlier than the second time point.

In one embodiment, in response to the modification of the value of said first parameter, the value of said first parameter is transmitted to a server, said server configured to transmit a collectable game object of said one or more collectable game objects to said device in dependence upon the value of said first parameter.

In one embodiment, a collectable game object of said one or more collectable game objects is accumulated if the first parameter is equal to one of a set of predefined values.

In one embodiment, when the first parameter is equal to the largest of the set of predefined values, said first game objects are not displayed.

In one embodiment, when said number of said collectable game objects accumulated has reached a predetermined reward value a reward game object is accumulated.

In one embodiment, the step of accumulating a reward game object comprises associating an increased quantity of said reward game objects with a user account.

In one embodiment, the step of accumulating one or more collectable game objects comprises associating an increased quantity of said collectable game objects with a user account.

In one embodiment, prior to said one or more first game objects being displayed, said one or more first game objects are transmitted from a server to the device.

In one embodiment, said first game objects are transmitted from a server to the device in dependence upon a time-dependent parameter.

According to a second aspect, there is a device having: a user interface, at least one memory, said user interface being configured to receive user input, and at least one processor in connection or communication with at least one memory configured to: display on said display one or more first game objects; in response to user input via said user interface, accumulate one or more collectable game objects, said collectable game objects comprising or associated with said first game objects; determine if a number of said collectable game objects accumulated has reached a predetermined value, and if so: display on said display a further set of one or more of said first game objects only if at least one game condition is satisfied.

According to a third aspect, there is a computer readable storage device storing program code instructions that, when executed by at least one processor in communication with a user interface and at least one memory, causes the at least one processor to: display on a display of the device one or more first game objects; in response to user input via said user interface, accumulate one or more collectable game object, said collectable game objects comprising or associated with said first game objects; determine if a number of said collectable game objects accumulated has reached a predetermined value, and if so: display on said display a further set of one or more of said first game objects only if at least one game condition is satisfied.

According to fourth aspect, there is a server in communication with a user device comprising: a user interface, at least one memory, and at least one processor in connection or communication with at least one memory, said server configured to: receive from said user device a message indicating user input via said user interface; in response to said message transmit a collectable game object of a set of collectable game objects to said user device, said collectable game objects comprising or associated with first game objects displayed on a display of said device; determine if a number of said collectable game objects accumulated has reached a predetermined value, and if so: signalling the user device to display a further set of one or more of said first game objects only if at least one game condition is satisfied.

According to a fifth aspect, there is a computer implemented method for controlling the exchange of game objects between a database and a user device comprising: a user interface, at least one memory, and at least one processor in connection or communication with at least one memory, the method comprising the steps of: receiving from said user device a message indicating user input via said user interface; in response to said message transmitting a collectable game object of a set of collectable game objects to said user device, said collectable game objects comprising or associated with one or more first game objects displayed on a display of said device; determining if a number of said collectable game objects accumulated has reached a predetermined value, and if so: signalling the user device to display a further set of one or more of said first game objects only if at least one game condition is satisfied.

According to a sixth aspect, there is a computer system comprising a server having a processor executing an application to exchange messages with a plurality of user devices, each user device having a user interface configured to display to a user animated game objects in different levels of a Saga game format, the user device from a local client installed to execute a game which displays locatable seasonal objects, wherein a message from the server generates a notification to each user device that a predetermined number of locatable seasonable objects are to be located in a predetermined time.

In one embodiment, the computer system can further be configured so that a preselected member of the locatable seasonal objects generates a reward for a user when the user locates them and selects them on his display.

In one embodiment, the reward is an appropriate reward for the level of the game in which the user is currently engaged.

In one embodiment, the reward is a set of gold bars, exchangeable in the game for play items.

In one embodiment, computer system is organised so that the local client is playing the game Papa Pear by King.

In one embodiment, the locatable seasonal objects are Easter eggs.

In one embodiment, the computer system is responsible for determining for each user if they have located seasonal object, and identifying whether that seasonal object contains a reward.

In one embodiment, the number of seasonal objects is accumulated for each user in an accumulation unit and the number in an accumulation unit is compared with the predetermined number to determine when a user has reached the goal.

BRIEF DESCRIPTION OF DRAWINGS

To understand some embodiments, reference will now be made by way of example only to the accompanying drawings, in which.

DETAILED DESCRIPTION OF THE INVENTION

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in a large variety of different game styles and genres.

The terms user and player are used interchangeably throughout this document and no specific meaning is intended using one or the other unless the context suggests otherwise.

Figure 1:
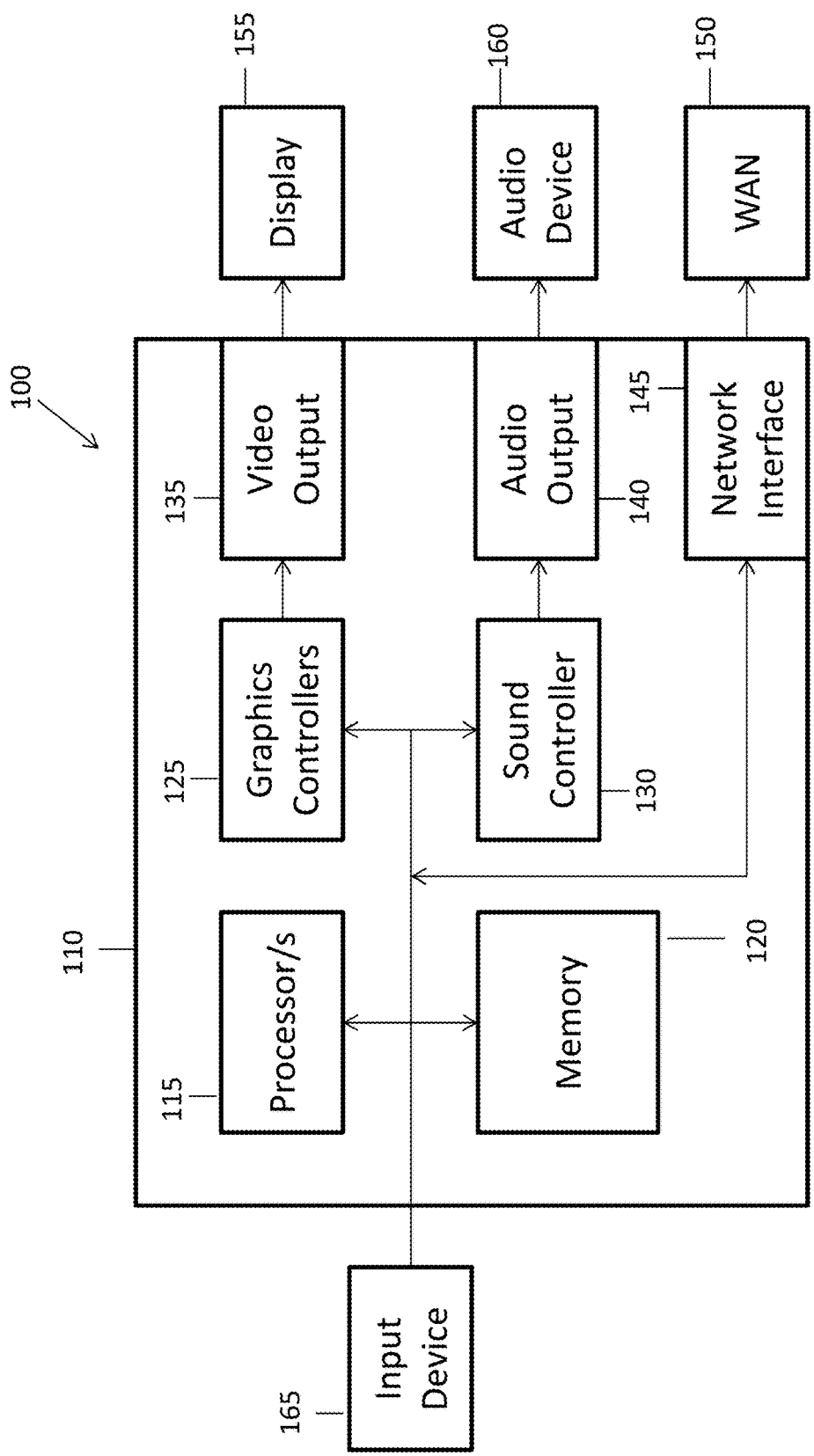
FIG. 1 shows an example client or user device of an embodiment.

A user device 100 according to an embodiment is shown in FIG. 1. All of the blocks shown may be implemented by suitable circuitry. The blocks may be implemented in hardware and/or software. The user device 100 may have a control part 110. The control part 110 has one or more processors 115 and one or more memories 120. The control part 110 is also shown as having a graphics controller 125 and a sound controller 130. It should be appreciated that one or the other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio output 140 is provided to an audio device 160 such as a speaker and/or earphone(s).

The device 100 has an input device 165. The input device 165 can take any suitable format and can be one or more of a keyboard, mouse, touch screen, joystick or game controller. It should be appreciated that the display 155 may in some embodiments also provide the input device 165 by way of an integrated touch screen for example.

The blocks of the controller 110 are configured to communicate with each other via an interconnect such as a bus or any other suitable interconnect and/or by point to point communication.

It should be appreciated that in some embodiments, the controller 110 may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 19:
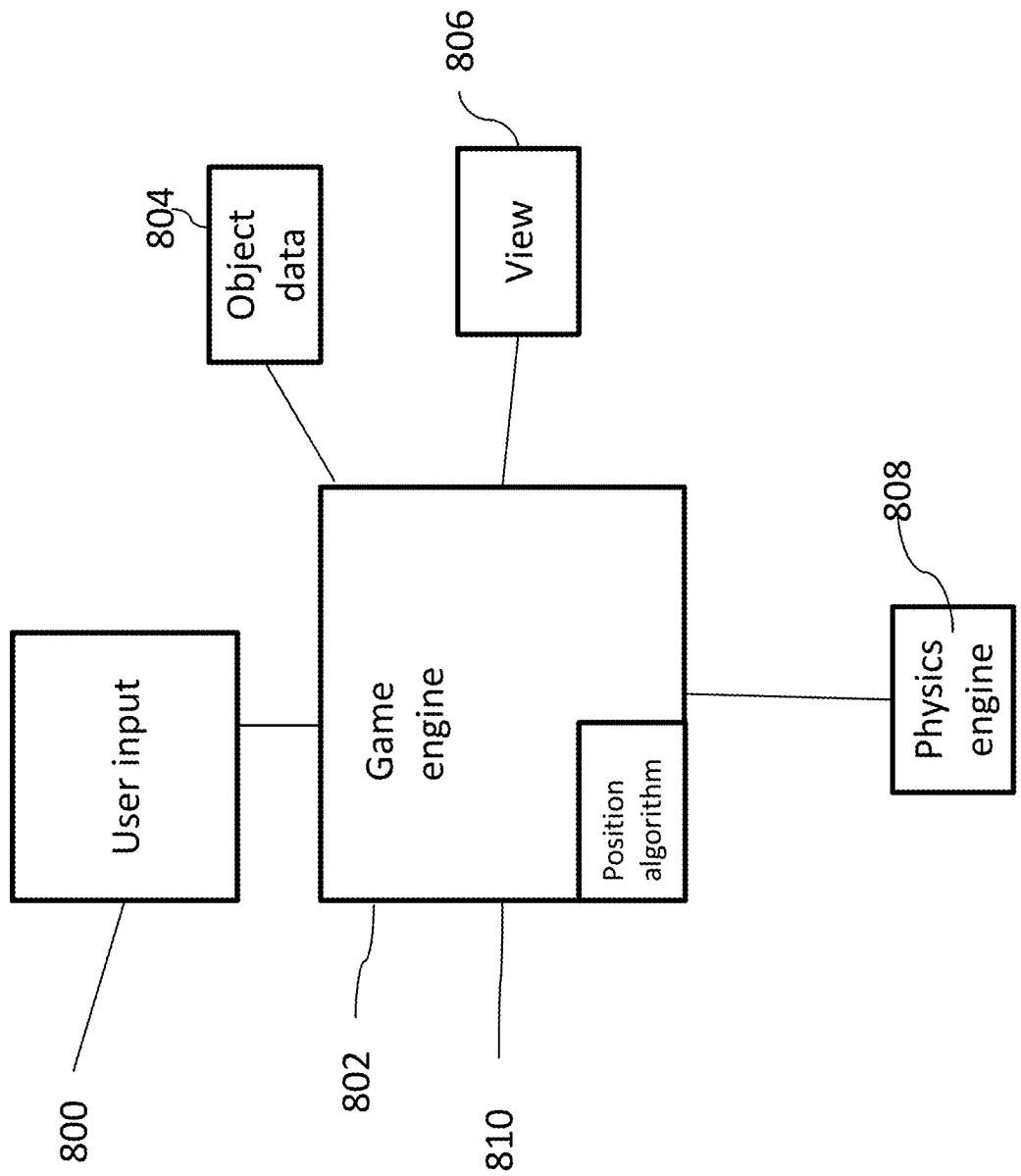
FIG. 19 illustrates a schematically shows the functional blocks of an embodiment, which may enable such game play.

Reference is made to FIG. 19 which schematically shows the functional blocks of an embodiment, which may enable such game play. A user input block 800 is shown. This captures the user input and feeds the input to a game engine 802. This user input can be via any suitable user interface, such as discussed earlier.

The game engine 802 will process the information provided by the user input. The game engine 802 (for example a game model) will determine if a valid combination has been made.

Each object has object data associated therewith. The object data 804 may be stored in any suitable memory location. In some embodiments, the object data may be considered to be part of the game engine and in other embodiments may be considered to be outside the game engine. The object data may provide information as to the properties of an object. These properties can include attribute information such as colour and/or whether or not an object has a particular function such as a so-called booster function. The object data may include the position data, that is, information representing the position of the object in the displayed image.

In some embodiments, the game engine will check if the game object satisfies the rule or rules for a valid match or game condition. The rule or rules define whether or not a match or game condition has been satisfied. The match or game condition will be dependent on the game.

Thus, the game engine will be in control of the matching or game mechanism. The game engine will have access to data for each object including its position and the at least one characteristic associated with the object, and will be able to determine if a match or game condition has been met. If a match or game condition is met, the objects may be removed from the game area.

A physics engine 808 is provided which is configured to control the movement of moving objects on the display, for example the game objects in the arrangement or the player object. A player object may be a game object which is displayed moving along a determined target path. The physics engine may manage the movement of an object based on, for example, gravity which controls the falling of the object, a wave mechanism, collision detection, when the falling object hits another object and optionally rotation calculations when the falling object rolls, for example, down the side of the other objects. The physics engine may manage the movement of an object in dependence on a determined target path.

The movement of the object is thus controlled by the physics engine, which will control the movement of objects in the game area.

The physics engine 808 may be part of the game engine 802 or separate therefrom. In some embodiments, the physics engine function may be provided by a physics engine in conjunction with another function, separate to the physics engine. That separate function may be a separate physics engine, part of the game engine or provided by one or more processors.

A position control block 810 is provided. In the embodiment shown, this position control block may be part of the game engine. In other embodiments, this position control block may be outside the game engine. The position control block may be provided by a position algorithm in some embodiments.

A view function 806 uses the object data to provide the displayed image with which the user is able to view and/or interact.

The functions of FIG. 19 may be provided by one or more of the blocks of FIG. 1.

The blocks of the controller 110 are configured to communicate with each other by an interconnect such as a bus or any other suitable interconnect and/or by point to point communication.

Figure 2:
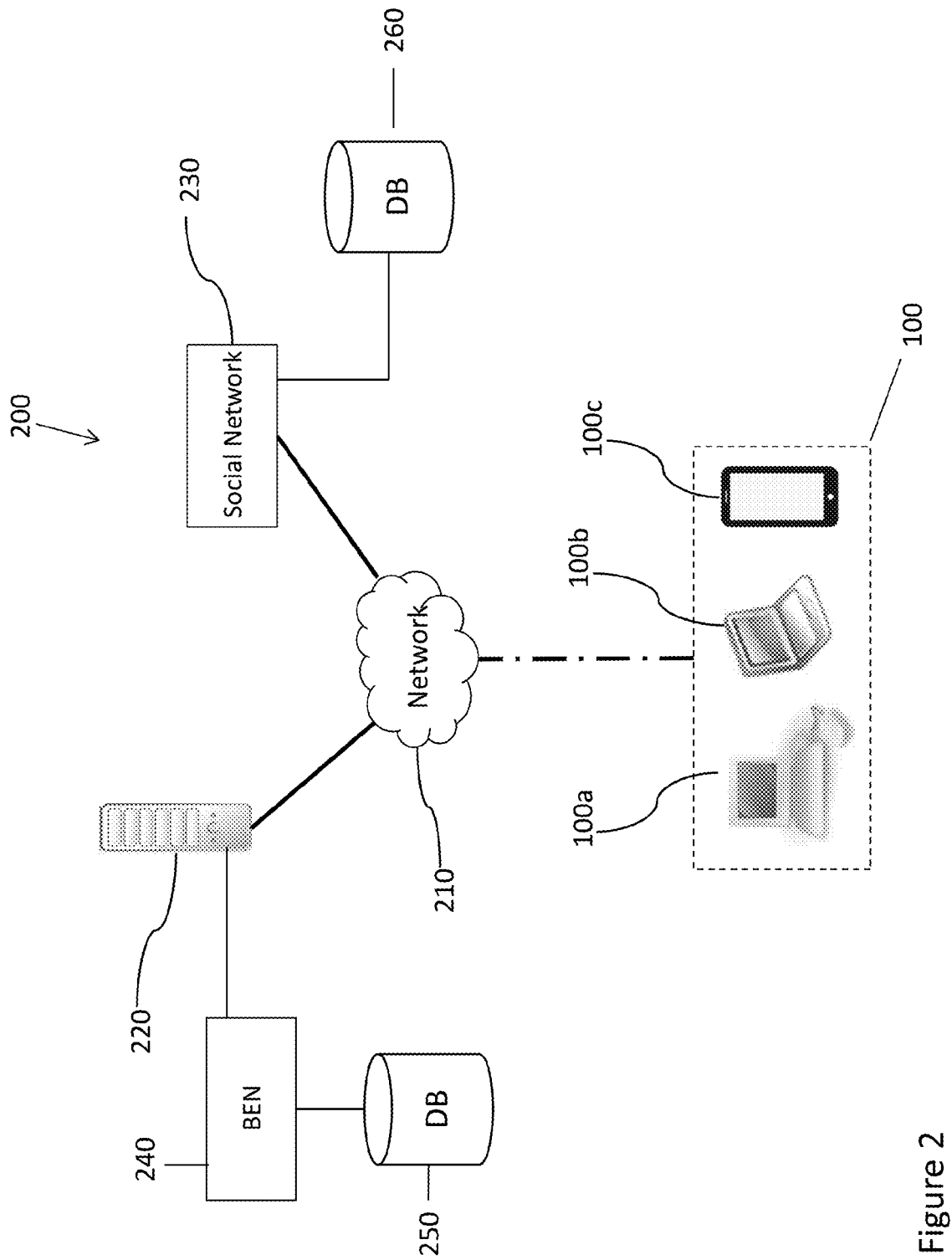
FIG. 2 illustrates an example system in which some embodiments may be provided.

FIG. 2 schematically shows a typical system 200 in some embodiments. The system 200 comprises a server 220 which may, in some embodiments, communicate with a database 250 through back end infrastructure 240 "BEN". In an alternative embodiment, the database 250 may be provided within the server 220. The database 250 may store, amongst other things, gameplay data, game player's details, profiles, statistics, etc. In practice, one or more databases 250 may be provided. Where more than one server 220 is provided, the database(s) 250 may be provided in one database 250 or across two or more servers 220, 310. The server 220 may also have a games data function. This may comprise one or more units of memory to store the computer game program and user behaviour data, and a processor to run the games program and process the user behaviour data.

The server 220 may communicate via for instance the internet 210 to one or more user devices 100, shown in the figure by way of example as user devices 100a, 100b and 100c, and may further provide connections to a social network 230 such as Facebook™.

It should be appreciated that embodiments may be deployed in different system architectures. For example, the computer game may be implemented as a computer game that is stored in the memory 120 of the user device 100 and is run on the processor 115 of the user device 100. However, the server 220 may handle some elements of the game in some embodiments. By way of example only, a Java game applet may be provided to the user device 100 and the locally running Java applet will generate, for example, the graphics, sounds, and user interaction for the game play on the user device 100. Some data may be fed back to the server 220 to allow interaction with other players. The data which is fed back may also allow scoring and/or cross platform synchronization.

The game may be accessed through a user account, which associates user ID information—such as usernames, passwords, etc.—with game progress information. This information may be stored at a server 220 which the user device 100 connects with in order to download said game progress information. Additionally or alternatively, the game progress information may be stored at the user device 100 itself. To access the game, the user may enter their login details, which may comprise account identification information. The account identification information may be transmitted from the user device 100 to the server 220 through the WAN 155. The server may use the account identification information as a key into a database 250 to retrieve the game progress information associated with the account identification information and transmit said game progress information to the device. The user may then play the game using the saved status from the game progress information.

In some embodiments, the user account may take the form of a social network account identified by social network account identification information. In this case, the user may login using their social network account details and access the game through the social network site. The user device may transmit the account identification information through the network 210 to a social network 230. In one embodiment, the game progress information may be stored at a database 260 associated with the social network 230. The database 260 may comprise social network user account information, such as friends, photos, posts, etc. The social network user account information may also comprise the game progress information. The account identification information, which is received at the social network 230 may then be used as key into the database 260 to retrieve the game progress information associated with the account identification information. This information may then be transmitted through the network 210 to the user device 100. In an alternative embodiment, accessing the social network using the account identification information provides access to game progress information stored in alternative location such as database 250.

Alternatively or additionally to the above embodiment, information associated with the user account, including game progress information, may be stored locally at the user device 100. The game progress information be stored only temporarily or may be stored permanently. In one embodiment, the game progress information may be stored at the user device 100 only. Alternatively, the game progress information may also be stored at a remote storage location such as database 250 or database 260.

It would be understood by the skilled person that the user account may take any form in which information associated with said user account comprises game progress information and in which said user account is associated with a unique user device and/or unique user account identification information.

In one embodiment a game may provide an additional gaming function or mini-game/bonus game that may be provided within the main game. An example of such a bonus game will be provided in the following description, the game taking the form of an Easter egg hunt game. One of the challenges that may be encountered by the person skilled in the art is how to implement a bonus gaming function in the context of the main game, so that the gaming function of the bonus game and the gaming functions of the main game interact in such a way as to be engaging and rewarding to players so as to provoke repeat play. Some embodiments may at least partially address this issue.

In accordance with embodiments a player is advised that they have to find a predetermined number of locatable seasonable objects (e.g. Easter eggs) in a predetermined number of days. The predetermined number of locatable seasonable objects may for example be sixty, however it will be appreciated that this is merely an example. The predetermined number of days may be four, however it will be appreciated that this is merely an example.

There may be a predefined sequence of eggs that provide a reward to a user. The user is not aware of the predefined sequence in advance. Every few eggs may provide a reward to the user. This predefined sequence of eggs that provide a reward to a user may for example be the third, seventh, sixteenth egg, etc.

In one embodiment, when the user finds any egg this is communicated to the server and there's a call back with information about the status of that egg collection. If there's a reward or not, this information comes in the call-back parameters. The reward may be, for example, one or more gold bars. This call back may be sent from the server to the user device on which the game is executed.

The server also supplies information to the user device (on which the game is executed) informing the user on how many eggs are left.

Whilst the above has been described with reference to the locatable seasonal objects being Easter eggs, this is just an example and embodiments of the present disclosure also extend to other locatable seasonal objects.

In one embodiment, the eggs may be present on a level map of the game. Each time this map is opened—e.g. by loading the game, or returning from a level—4 or 5 eggs may be present on the level map. By user input, e.g. by clicking on the eggs, the user can crack them open and find out what's inside. Some eggs may contain a prize (e.g. 5 gold bars), but it may be that most eggs have nothing inside. There may, for example, be two animations when an egg is clicked. In one case, the egg cracks and contains nothing. In the other case, the egg contains gold which flies to a gold bar counter.

In one embodiment, there are a total of 8 eggs having a prize inside. Therefore, if each prize comprises 5 gold bars, the player may get a total of 40 gold bars. The eggs that contain a prize may not be randomly selected, but rather there may be predefined sequence, for example: $3^{rd}$, $7^{th}$, $12^{th}$, $15^{th}$, $28^{th}$, $32^{nd}$, $41^{st}$, and 60th. In this case, to get all of the gold, the player has to click on 60 eggs. The prize may only appear if the player has played a level since the last prized egg so as to avoid people refreshing the map compulsively. When the last egg with a prize is found, a popup congratulating the player may be shown and no more eggs appear on the map, even if the Easter season campaign hasn't finished.

In one embodiment, player may have to unlock the features, i.e. the eggs and the welcome popup are not shown to users who have not progressed to level 5 of the levels of the map.

When the user loads the game during the Easter season, a welcome popup may be displayed explaining the mechanics of the game in a few sentences. This welcome/tutorial popup may be displayed only once. Thereafter, several animated eggs, skinned with different accessories are displayed on the level map. There may be 5-6 eggs randomly placed every time the map is loaded. They may be displayed in one episode of the level map rather than having eggs placed in adjacent episodes.

The computer device will track how many eggs the player clicked so as to determined prize allocation. However, to avoid people earning prizes by refreshing the map compulsively, gold may only be awarded to a player if a level was played since the last prize.

The general concept behind the bonus game is to hide eggs in the game. These eggs may be clickable items such that when a player clicks on an egg it's collected. When a player has collected all eggs, they then receive for free an item being sold during the Easter promotion. An example will now be described in the context of a game known as 'Papa Pear Saga'. However, the person skilled in the art will understand that the embodiments described are examples only and that the principles of the present disclosure may be implemented in a wide variety of computer implemented games.

Figure 3:
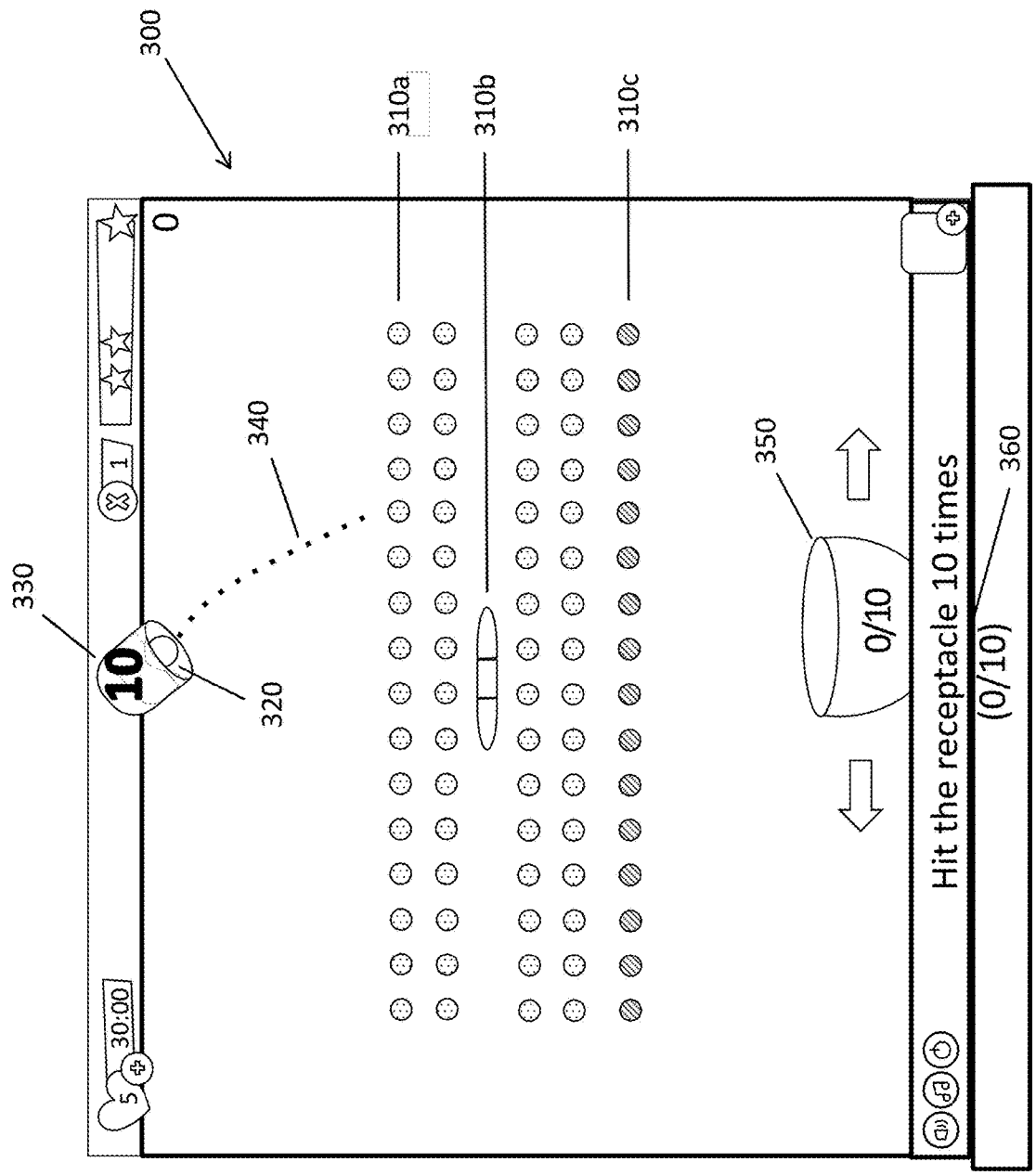
FIG. 3 depicts an example game screen showing a level of a game according to an embodiment.

FIG. 3 shows an example level of the game. The level has a game board 300 for display on a user device 100 according to an embodiment. Shown on the game board 300 are a series game objects 310 of different types 310a, 310b, and 310c which may, in this example, be eliminated by collision with a user object projectile 320 which is aimed by the user using, for example, touch input or mouse input or other pointing device input. The processor 115 uses the game engine 170, which is stored in the memory 120 of the device, to determine the changes to be made to the projected trajectory 340 of the projectile 320 on the basis of the user input. The processor may receive user input from the input device 165 and then calculate a new trajectory for the user object projectile 320 on the basis of this user input and game engine data loaded from the memory 120. For example, user input requesting the rotation of the barrel 330 shown at the top of the screen to select the trajectory 340 the projectile will have when fired from the barrel may be received at the processor. After determining the appropriate response on the basis of the input and the game engine 170, the processor may then signal the graphics control 125 which causes the display 155 to show the rotation of the barrel and hence the modification of the trajectory 340.

Figure 4:
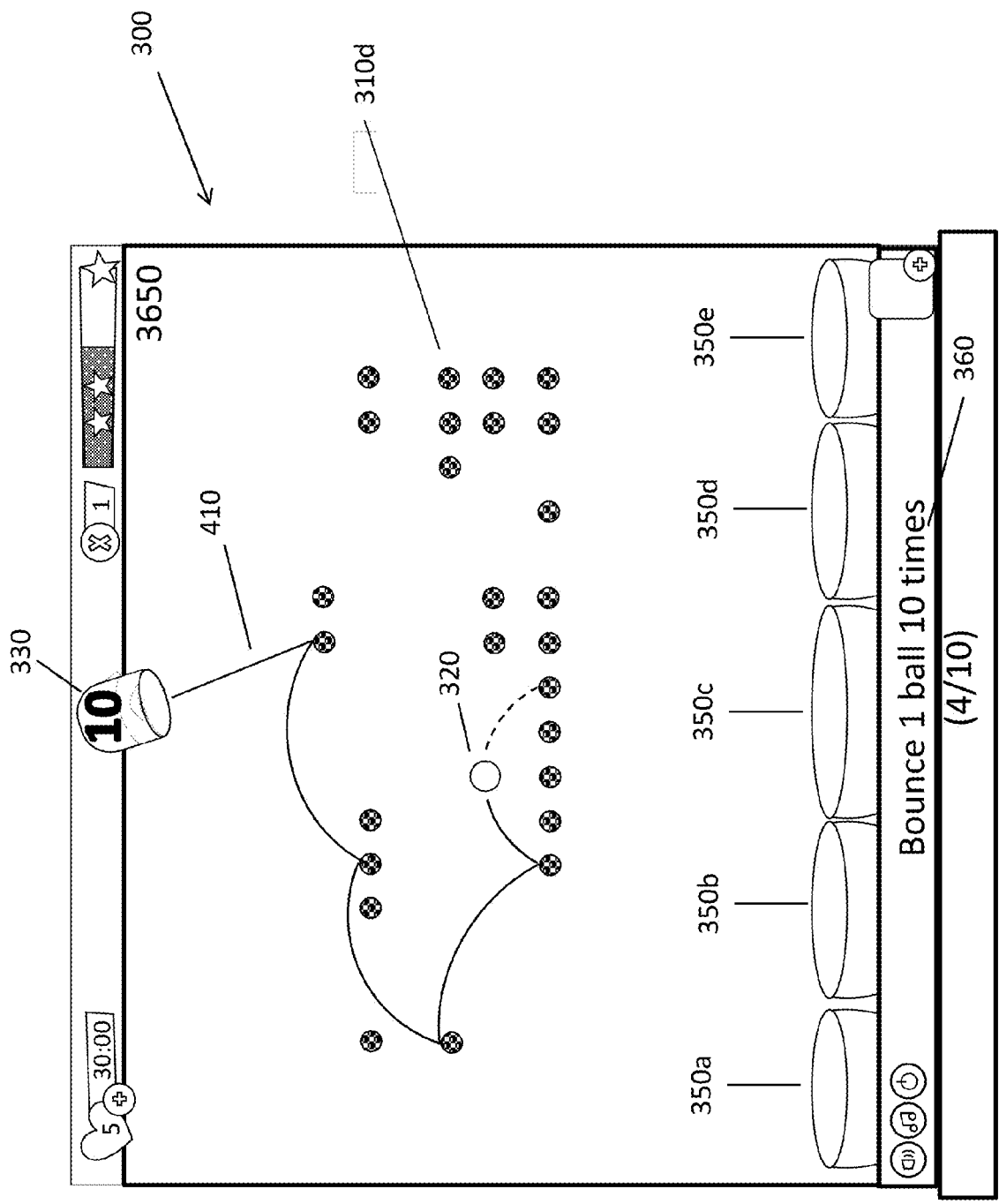
FIG. 4 depicts an example game screen showing a level of a game according to an embodiment.

FIG. 4 shows an embodiment of the game board shortly after the projectile 320 has been fired. When the projectile 320 has been fired from the barrel 330 via player input, the projectile 320 is acted upon by a gravitational force, causing it to accelerate towards the bottom of the game board 300. The projectile 320 follows a path 410, and may collide with game objects 310d as it does so. When the projectile 320 reaches the bottom of the game board 300 it will fall into one of the receptacles 350a, 350b, 350c, 350d, and 350e, and thereby cause a number of points to be awarded. The number of points awarded to the player is dependent upon the number and type of the game objects 310 that the projectile 320 collided with as it traversed the path 410 to the bottom of the game board 300.

In one embodiment, each level of the game can either be completed successfully or failed. In FIG. 4, the text 360 displayed at the bottom of the screen states the criteria that the player must achieve in order to successfully complete the level. In this case, the player has only to bounce projectiles 320 off of game objects 310 ten times to complete the level. There may be a limit on the number of projectiles 320 that the player can launch onto the game board 300 during a level. This limit is indicated by a number '10' on the barrel 310. If the player reaches this limit then the level will be failed.

After the criteria for successfully completing a level of the game have been satisfied, the game progress information is updated. This may involve the processor 115 overwriting game progress information stored in the memory 120. Additionally or alternatively, game progress information stored in a remote database 250. This may be achieved by transmitting a data file comprising account identification information and updated game progress information over the WAN 150 or other network to the server 220. The server 220 may use the account identification information as a key into the data stored in the database 250, to locate the game progress information associated with the account identification information and to update it with the game progress information received from the user device 100. In some embodiments, updating game progress information stored in the database 250 may occur periodically, instead of or as well as after the completion of a level of the game. Alternatively, the account identification information may be social network account identification information. The data file may then be transmitted through the network 210 to the social network 230, to locate the game progress information associated with the social network account identification and to update it with the game progress information contained in the data file.

Figure 5:
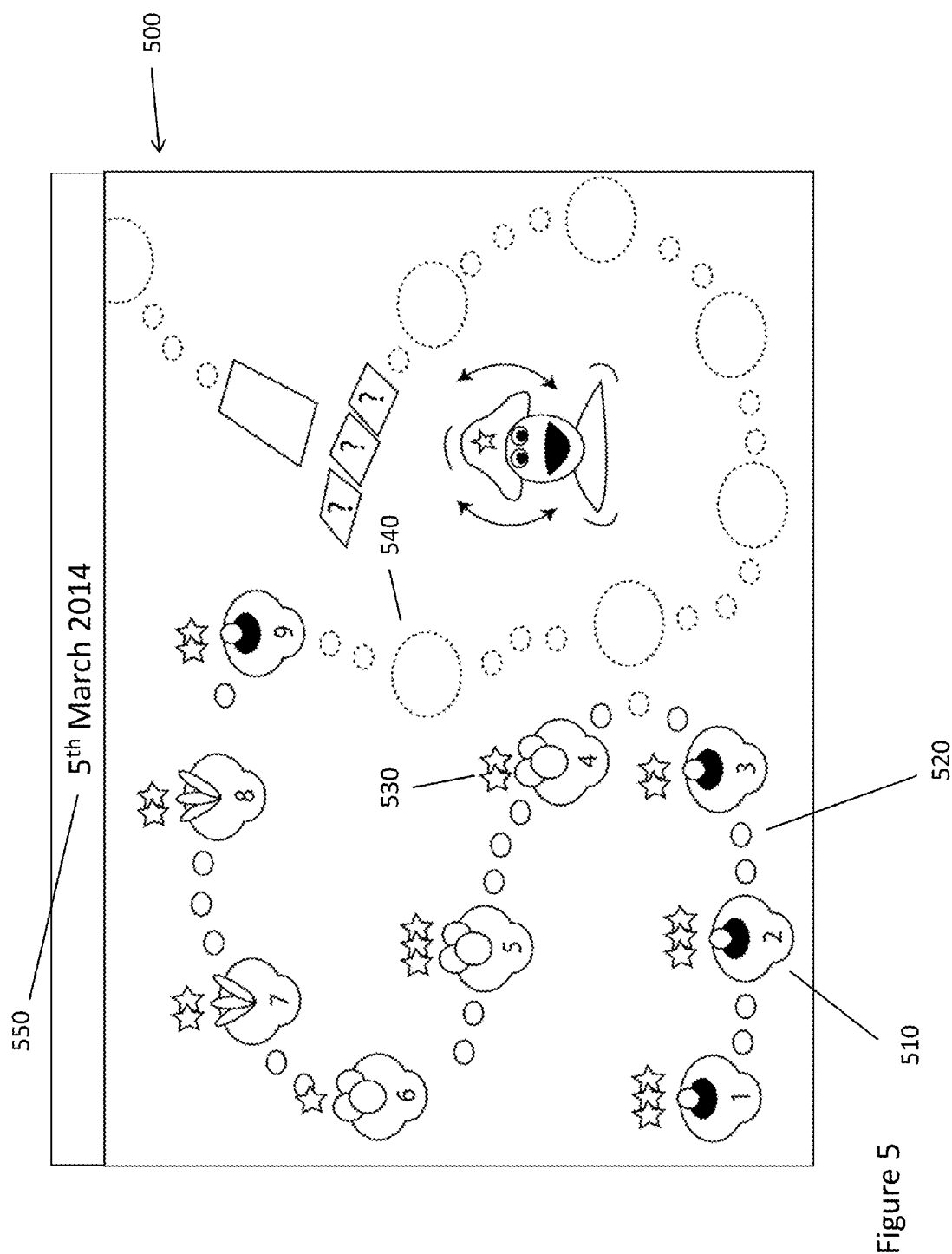
FIG. 5 depicts an example game screen outside of the seasonal period according to an embodiment.

FIG. 5 shows one embodiment in which, after the player has finished playing a level of the game, the processor 115 retrieves from the memory 120 parameters specifying the characteristics, such as the appearance, of a game map 500 which is then shown on display 155. Some or all of the parameters specifying the characteristics of the game map may form part of the game progress information stored in the memory 120 and/or the databases 250, 260. These parameters may be updated periodically and/or after the completion of a level as explained above. Features of the game map 500 may, therefore, change over time as the user progresses through the game. The game map 500 shows a series of nodes 510 displayed along a progression path 520. Each node 510 may be representative of one of the levels of the game. In this example, the levels that have been successful completed by a player are shown as having one or more stars 530 placed above their corresponding node 520. The player may be able to select any one of these already completed levels to play or may be able to select the next level 540 along the path that has not yet been completed.

At the top of the game map screen 500, an indication 550 of the value of a time-dependent parameter may be shown. In this case the time-dependent parameter takes the form of the calendar date. It would, however, be understood by the person skilled in the art that the time-dependent parameter need not be a date but could be any type of information having a value having a value which is dependent upon the time.

In one embodiment, the time-dependent parameter is determined at the server-side, and then transmitted through a network 210 and received at the network interface 145 of the user device 100. Alternatively or additionally, the time-dependent parameter may be calculated by the user device 100 itself by, for example the processor 115 or a separate clock of the device 100. Having the user device 100 determine the parameter itself has the advantage that there does not then need to be a continuous live connection between the user device 100 and the server 220 in order for the user device 100 to possess an updated value of the parameter. However, if the time-dependent parameter is determined by the server 220, this may provide greater security since, if the parameter is determined by the device 100, it may be possible for the user to modify the parameter manually to cause a transmission of the set of activatable game objects when not appropriate.

In an alternative embodiment, the server 220 may determine the value of the time-dependent parameter but not transmit it to the user device 100. The user device 100, therefore, remains blind as to the value of the time-dependent parameter and its value remains unknown to the user.

In FIG. 5, the date 550 shown is the 5 Mar. 2014. In this embodiment, this value of the time-dependent parameter is such that the set of activatable game objects, the nature of which are explained below, are not displayed on the device 100.

Figure 6:
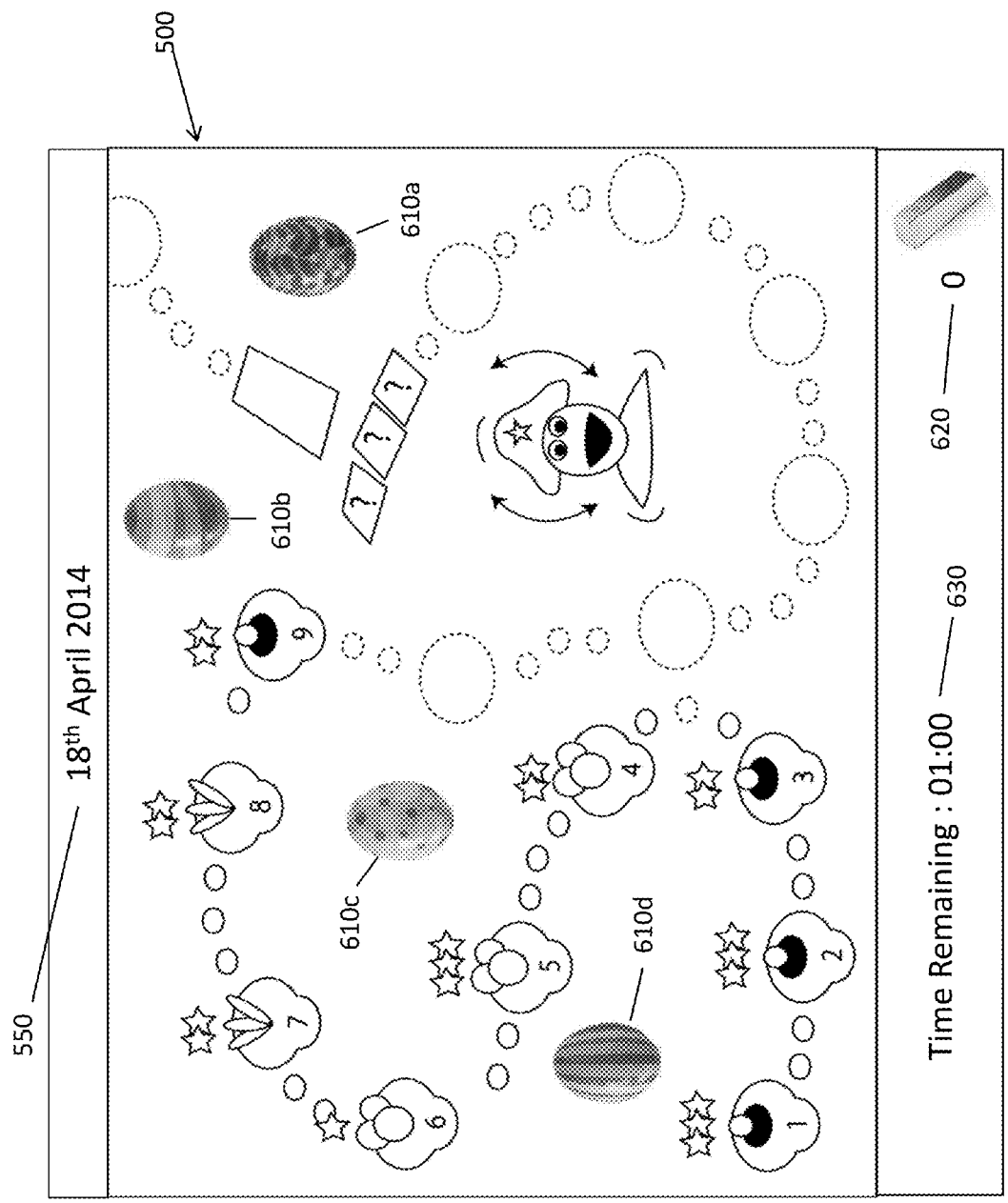
FIG. 6 depicts an example game screen during the seasonal period according to an embodiment.

FIG. 6 shows an alternative embodiment, wherein the time-dependent parameter 550 is now 18 Apr. 2014, which lies in the Easter period of 2014. In this case, the value of the time-dependent parameter is such that the user device responds by displaying at least a portion of a set of activatable game objects, which in this embodiment take the form of Easter eggs 610*a*, 610*b*, 610*c*, and 610*d*.

When the game is launched, the data required for displaying and defining the characteristics of the set of activatable game objects may not be part of the game which the user device downloads. This additional game data may, therefore, need to be downloaded from the server 220 when the time-dependent parameter takes a value indicating that the set of activatable game objects is to be displayed. In one embodiment, a download of the activatable game objects is triggered the first time during the Easter period in which the game is loaded. In one embodiment, the processor 115 monitors the value of a time-dependent parameter which is stored in the memory 120 of the device. The value of this time-dependent parameter may be continuously updated by the processor 115 itself or by a clock which is part of the device 100. The memory 120 may also contain data values specifying a range of values for a time-dependent parameter for which at least one of a set of activatable game objects should be displayed. The processor 115 may periodically compare the value of the time-dependent parameter to this range of values to determine whether or not the time-dependent parameter is within this range. If the value is within the range, the processor 115 may then signal the server 220 through the WAN 150 or the like to transmit the parameters specifying the characteristics of the set of activatable game objects. In another embodiment, the server 220 may monitor the value of the time-dependent parameter and determine when it lies within the range of values, so as to determine when to transmit the parameters specifying the characteristics of the set of activatable game objects. In another embodiment, the data required for displaying and defining the characteristics of the set of activatable game objects may be part of the original game data which the user device downloads. In this case, the parameters specifying the characteristics of the set of activatable game objects are stored in the memory 120 and are not downloaded when the value of the time-dependent parameter enters the range of values. In either case, when the value of the time-dependent parameters enters the range of values, the set of activatable game objects may be displayed.

In the example given herein, when the date lies within the Easter period and the user opens the game, the server 220 responds by retrieving from a database 250 the parameters specifying the characteristics of a set of activatable game objects, which may take the form of Easter eggs 610*a*, 610*b*, 610*c*, and 610*d*, and transmitting them to the user device. It would be understood by the person skilled in the art that the Easter period need not be used as the basis for determining whether or not the present date is suitable for transmission of a set of activatable game objects. Other periods of the year, such as Christmas or the player's birthday could also activate the transmission. Likewise, the activatable objects need not be Easter eggs but may, for example, take the form of Christmas presents.

The transmission of the set of activatable game objects from the server 220 to the device 100 may be accomplished by transmitting a set of parameters which are common to the set of activatable game objects, whilst also transmitting a set of parameters specifying any unique attributes of the individual game objects of the set. For example, parameters may be transmitted which describe common properties such as, the shape of Easter eggs 610*a*, 610*b*, 610*c*, and 610*d*, and the response of the Easter eggs when a user clicks on them. There may also be other parameters transmitted which describe properties of the individual eggs such as the colour patterns displayed on the eggs.

There may be a number 620 at the bottom of the screen providing a count of the number of game objects of a set of collectable game objects that have been obtained by the player of the game. The manner in which these game objects may be accumulated and associated with the user's account will be described later. In this embodiment, the game objects of the set of collectable game objects take the form of gold bars, but it would be understood by the person skilled in the art that any other game object could be used instead.

In one embodiment, a timer 630 is provided. This timer 630 may count down from the time when the first set of the game objects is transmitted to the user device 100 or alternatively from the time when the Easter period begins. The person skilled in the art would realise that these are examples only and that any suitable starting point for the timer 630 may be used. Furthermore, the timer may only count down when certain criteria are satisfied. I.e. the timer 630 may only count down when the player is playing the game, or when the player is viewing the map. Alternatively, the timer may count down at any time regardless of the activity of the player.

The player may be challenged to obtain a certain number of the game objects of the set of collectable game objects before the time limit is reached. The player may obtain the game objects by user input via a user interface of the device As will be explained, this may be achieved by adjusting a modifiable property of the game objects of the set of activatable game objects and thereby altering the value of a first parameter in dependence upon the result of a comparison between two time points.

A first parameter may be associated with a modifiable property of each of the game objects of the set of activatable game objects. In one embodiment, the Easter eggs 610a, 610b, 610c, and 610d may possess a modifiable property, wherein they can be switched between two possible states. One of these two states may be a regular non-cracked state, as shown by 610a, 610b, 610c, and 610d of FIG. 6. The other of the two states may be a cracked state. The player is able to activate an egg and switch it from a non-cracked state to a cracked state, and to thereby alter the value of a first parameter, by means of user input.

Figure 7:
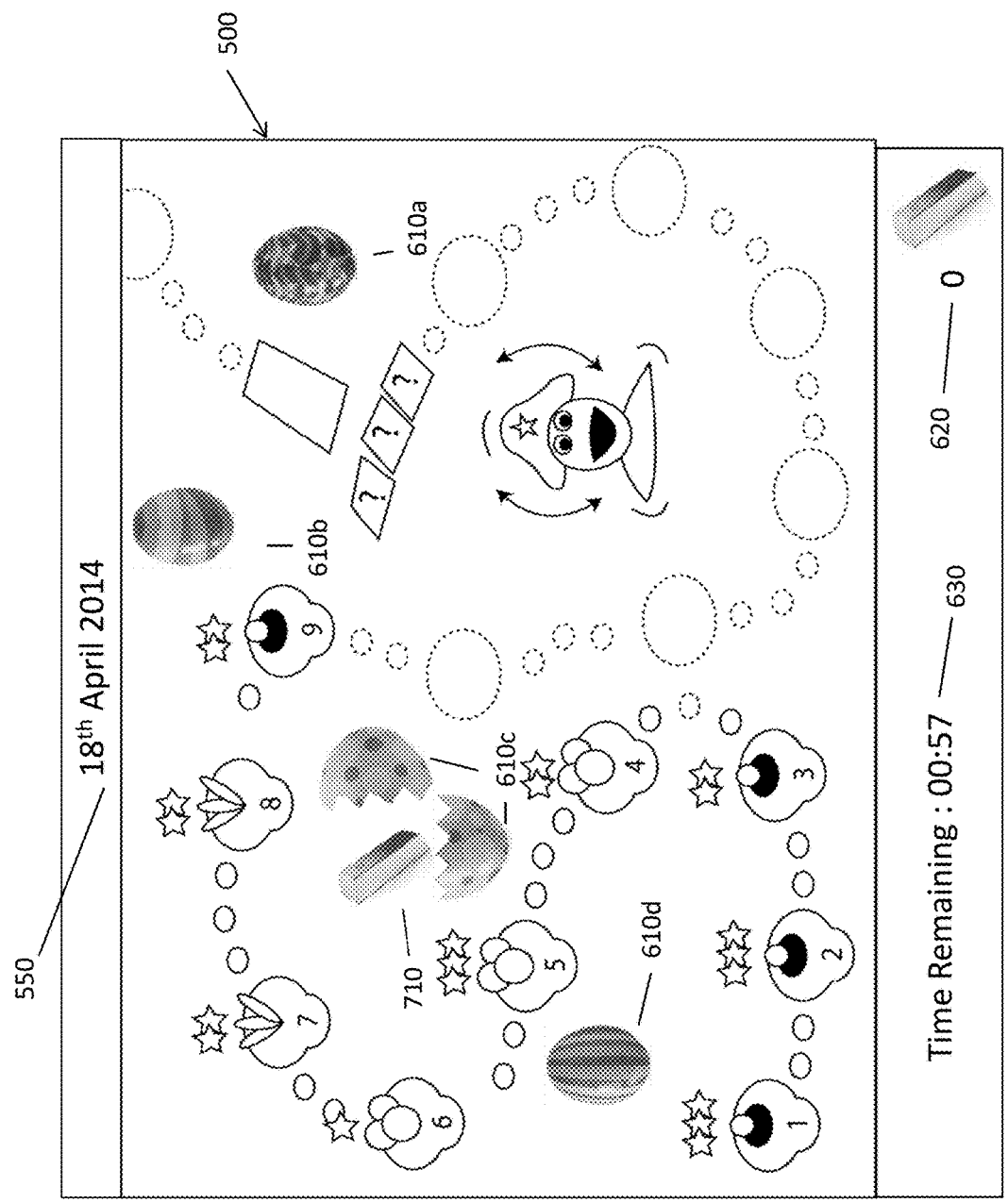
FIG. 7 depicts an example game screen with a collectable game object displayed according to an embodiment.

FIG. 7 shows an example of the game map 500, wherein the egg 610c of FIG. 6 has been shifted from the non-cracked state to the cracked state. The player may have caused the game object 610c to change state in this manner by clicking on it or by any other suitable input means. In this way, the player may adjust a first parameter associated with a modifiable property of the game objects of the set of activatable game objects. For example, the first parameter may increase by a value of one when the player clicks one of the game objects of the set of activatable game objects and changes its state.

A set of predefined values may be stored at, for example a server 220, a memory 120 of the user device 100, or a database 250. If the first parameter becomes equal to one of the predefined values, the display of a game object of a set of collectable game objects is triggered. For example, the predefined values may be: 3, 7, 12, 15, 28, 32, 41, 60. The first parameter may increase by one every time a user clicks one of the games objects of the set of collectable game objects. Therefore, in this example, when the user has clicked 3 Easter eggs, a game object of the set of collectable game objects is displayed. When the user has clicked another 4 Easter eggs (taking the total to 7) a second game object of the set of collectable game objects may be displayed.

In one embodiment, the user device 100 may transmit the value of the first parameter to a server 220 upon each change in the value of the first parameter. The server 220 may then compare the value of the first parameter to the set of predefined values which may be stored in a database of the server 220 or at an additional database. If the first parameter is equal to one of the set of predefined values, a game object of the set of collectable game objects is transmitted to the user device 100. Alternatively, the parameters defining the characteristics of the set of collectable game objects may already be stored at the user device 100. In this case, the server 220 may transmit a message to the user device 100 causing the user device 100 to display a game object of the second set.

In another embodiment, the user device 100 may check the value of the first parameter against the set of predefined values itself in order to determine whether or not to display an object of the set of collectable game objects, without the need for server input.

FIG. 7 shows an example where the egg 610c has been cracked and the value of the first parameter modified such that it takes the value of one of the predefined set of values. An object 710 of the set of collectable game objects is displayed. In this embodiment the set of collectable game objects take the form of gold bars 710.

Figure 8:
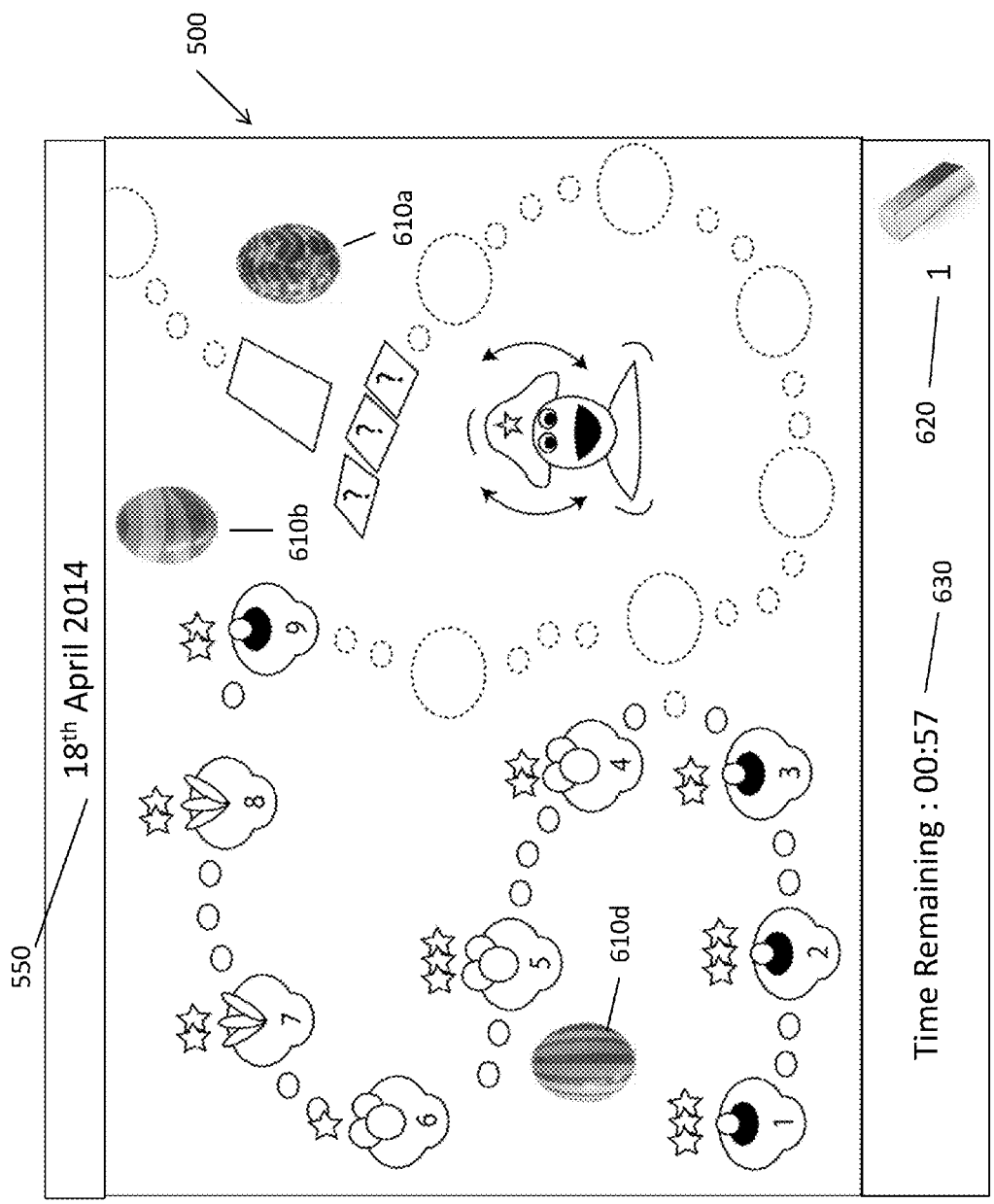
FIG. 8 depicts an example game screen after a collectable game object has been accumulated according to an embodiment.

FIG. 8 shows an example of the state of the display 155 a short amount of time after the egg 610c has been cracked to reveal the gold bar 710 as in the embodiment of FIG. 7. In this case, the bar 710 and the egg 610c have been removed from the display 155. The count displayed on the counter 620 may then increase by one to provide a record of the fact that the game object 710 of the set of collectable game objects has been obtained by the player.

Figure 9:
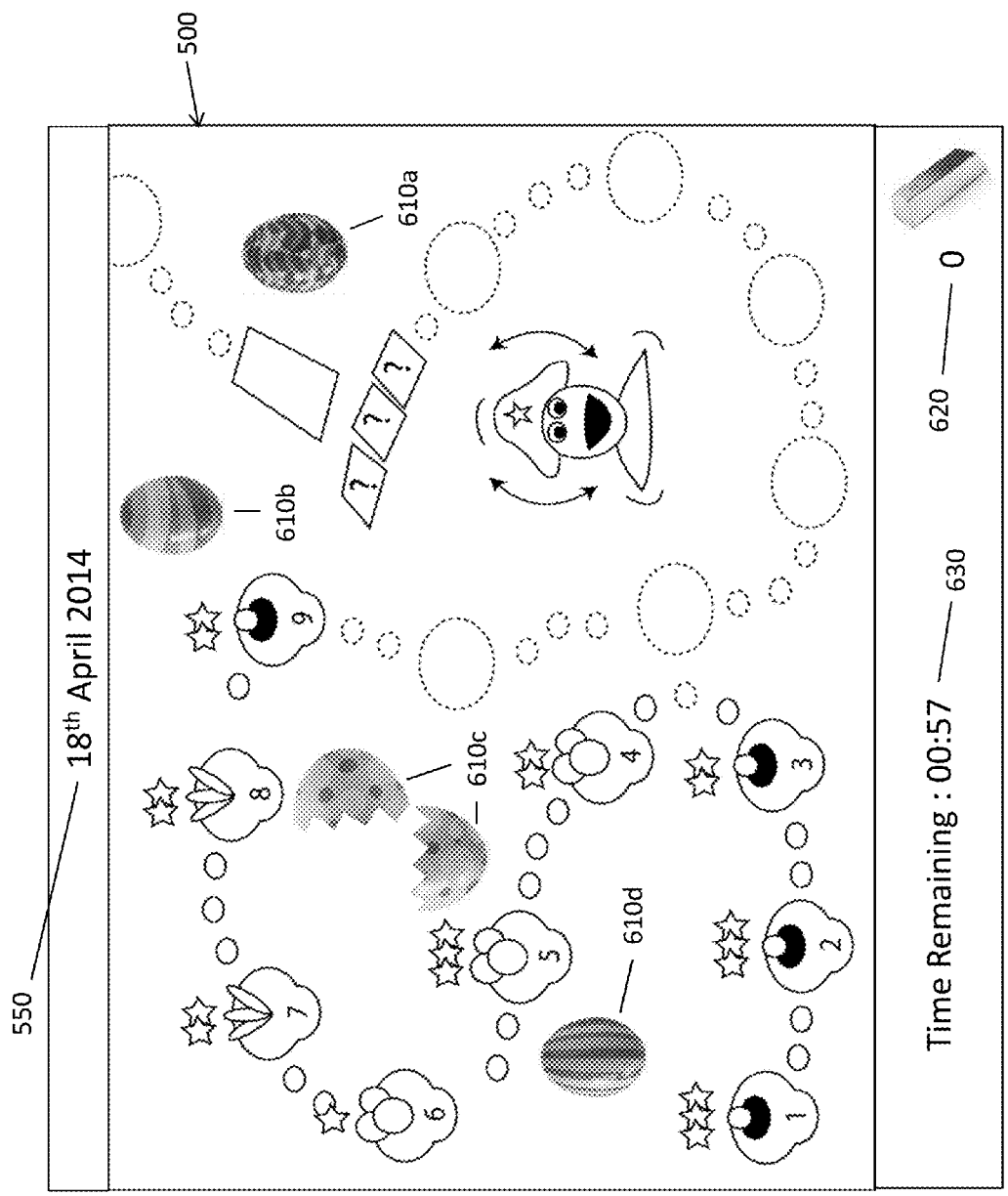
FIG. 9 depicts an example game screen with no collectable game object displayed according to an embodiment.

FIG. 9 shows an alternative embodiment to that illustrated in FIGS. 7 and 8. In this case the egg 610c has been cracked by player input, modifying the value of the first parameter to a value not of the set of predefined values. As a result, no game object of the set of collectable game objects is displayed.

As noted above, one of the challenges that may be encountered by the person skilled in the art is how to implement a bonus gaming function in the context of the main game, so that the gaming function of the bonus game and the gaming functions of the main game interact in such a way as to be engaging and rewarding to players so as to provoke repeat play. In the embodiment described herein with respect to FIGS. 5 to 11, this problem may take the form of how to prevent the player from accumulating all of the collectable objects in a short space of time. For example, a player of the game may click on all of the activatable objects shown on the level so as to accumulate all of the collectable objects possible. In one possible implementation of such a bonus game, the player may then refresh the screen (by reloading the level map) so as to show more activatable game objects on the level map which the user may then click so as to obtain more collectable game objects. The user could, in this case, simply refresh the screen compulsively so as to obtain all of the collectable game objects possible in a relatively short space of time. Embodiments address this issue, as will be explained below.

Figure 10:
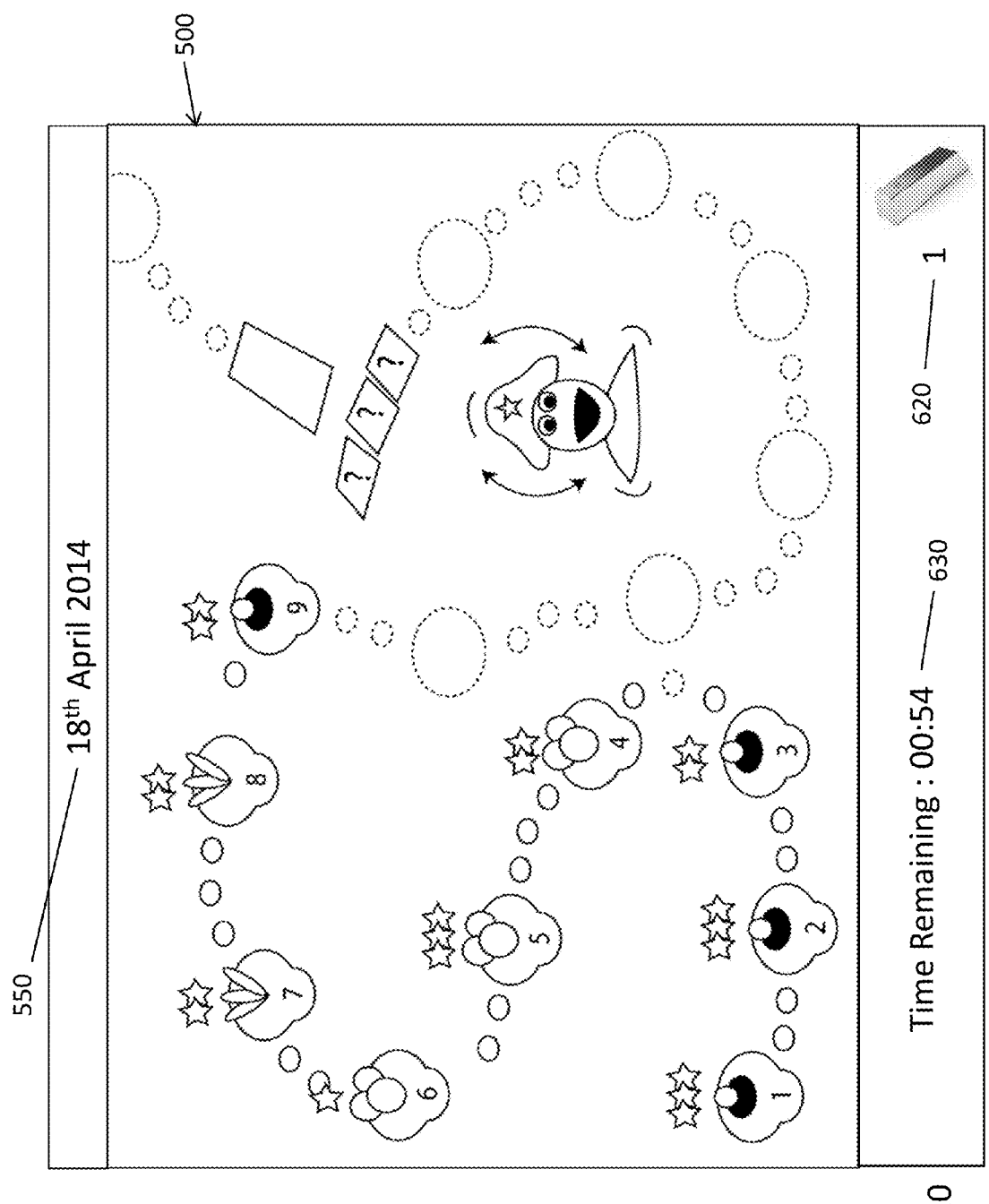
FIG. 10 depicts an example game screen after activatable game objects have been removed according to an embodiment.

FIG. 10 shows an example of the game map screen, according to an embodiment, wherein the three remaining eggs 610a, 610b, and 610d shown in FIG. 8 have been removed by the player. In one embodiment, no more game objects of the set of activatable game objects will be shown on the game map 500 until the player plays another level of the game. In one embodiment, the level of the game must be a level that the player has not previously completed. Alternatively, the level may be any level of the game. In one embodiment, the player may have to successfully complete the level in order to refresh the game map 500 and introduce new game objects of the set of activatable game objects. Alternatively, the game map 500 may be refreshed even if the player fails the level.

Figure 11:
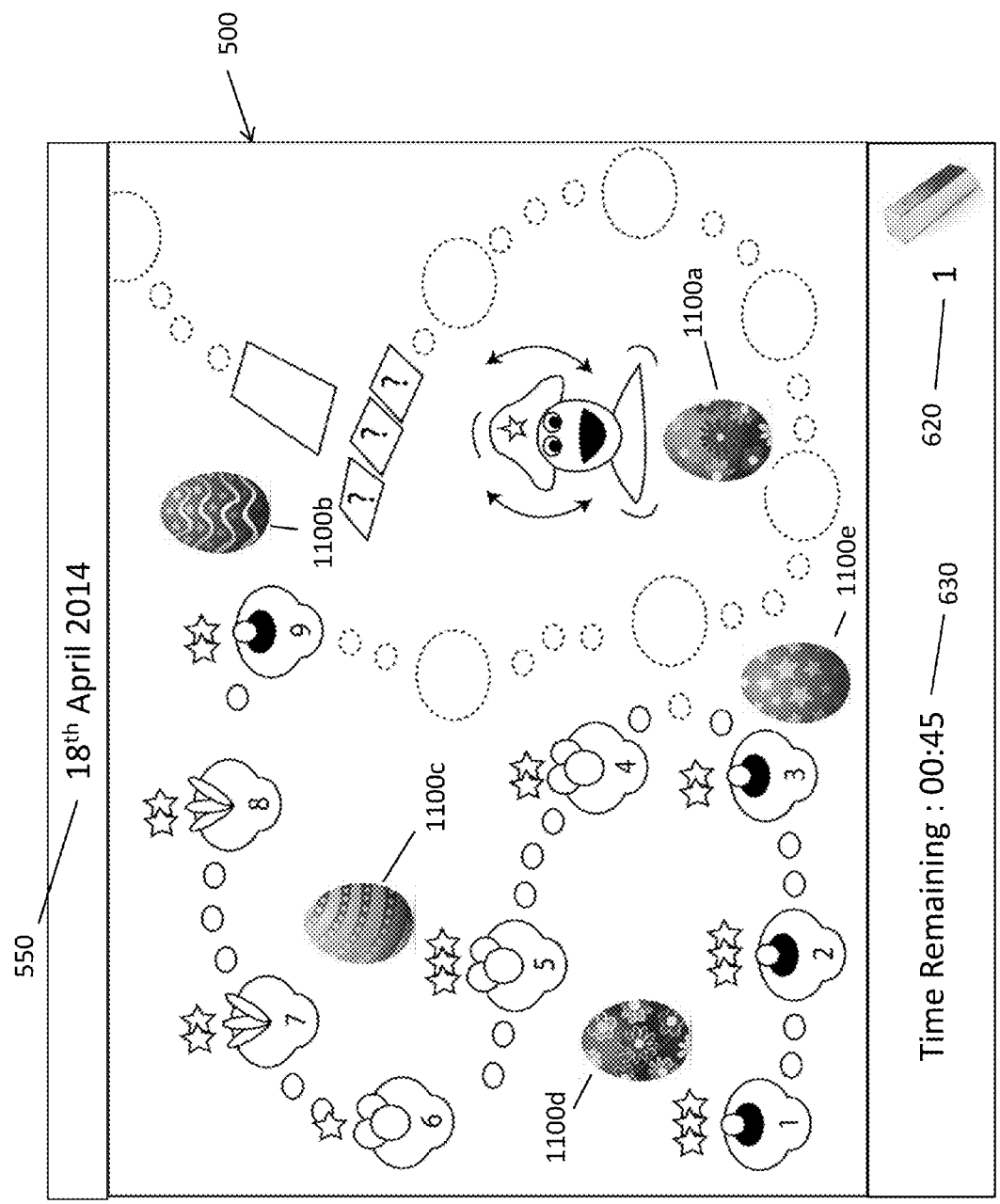
FIG. 11 depicts an example game screen after a user has played a level of the game.

FIG. 11 shows an example of how the game map 500 of FIG. 10 may look after the player has played a level of the game. A new set of game objects 1100a, 1100b, 1100c, 1100d, and 1100e of the set of activatable game objects are now displayed. The player can continue attempting to accumulate game objects 710 of the set of collectable game objects by user input associated with the game objects of the set of activatable game objects, thereby leading to an increase in the count 620.

In an alternative embodiment, a new set of game objects of the set of activatable game objects 1100 may continue to be displayed even if the player has not played the level of the game since removing the previous set 610. The player may be able to refresh the game map to achieve this without having to play a level, however, this may lead to a user compulsively refreshing the map in order to speedily obtain all of the game objects of the second set of game object. Such rapid and easy completion of the game described herein would therefore hinder the game in providing a challenge to a user or player that is engaging and rewarding so as to provoke repeat play.

Therefore, embodiments make it possible for a player to only obtain a game object of a set of collectable game objects only when at least one game condition is satisfied. This may be achieved by only displaying on said display a further set of one or more first game objects if at least one game condition is satisfied. The at least on game condition may be that the user has played a level of the game since the last collectable game object was accumulated.

In one embodiment, the first game objects are collectable game objects. In this case, the activatable game objects may be displayed on the device even if the at least one game condition to display the further set of one or more first game objects is not satisfied. The user input may cause the activatable game objects to be modified, e.g. cracked, however, no collectable game object will be accumulated if the condition isn't satisfied.

In an alternative embodiment, the first game objects are activatable game objects which are associated with the collectable game objects. In this case, the activatable game objects will not be displayed if the at least one game condition is not satisfied. Since, in some embodiments, the activatable game objects are necessary to accumulate the collectable game objects, if the activatable game objects are not displayed, the user cannot accumulate the collectable game objects.

In the case where the at least one game condition for the display of a further set of one or more of said first game objects is that the user must have played a level of the game since the last collectable game object was accumulated, an example may be given as to how to implement this feature using time points. Two time points may be made use of to determine whether or not the condition are satisfied. A first time point at which a game object of said set of collectable game objects is accumulated may be stored in a timestamp whenever, e.g. the user cracks an egg 610*c* to reveal a gold bar 710. In other words the first time is the time at which the first parameter last became equal to one of the set of predefined values. A second time point at which the user last played a level of the game may also be stored in a timestamp.

In some embodiments, when a user input associated with a game object of the set of activatable game objects is made (e.g. the user click on one of the eggs 610*a*, 610*b*, 610*c*, 610*d*), a comparison may be made between these two timestamps relating to the first time point and the second time point. Depending upon the result of the comparison, the value of the first parameter may or may not be adjusted.

For example, if it is determined upon making the comparison that the first time point is earlier than the second time point, it is therefore the case that the user has played a level of the game since the last game object of the set of collectable game objects was displayed and the value of the counter 620 was adjusted to take account of this. In this case, when a user input associated with a game object of the set of activatable game objects is made, it may therefore be determined on the basis of this comparison not to modify the value of the first parameter. Since the value of the first parameter is not modified, even if the user continues to click the game objects 1100*a*, 1100*b*, 1100*c*, 1100*d*, and 1100*e* of the set of activatable game objects and even if the user refreshes the game map to produce new game objects of the set of activatable game objects, no new game objects 710 of the set of collectable game objects will be displayed and obtained.

If on the other hand, it is determined upon making the comparison that the first time point is later than the second time point, it is therefore the case that the user has not played a level of the game since the last game object of the set of collectable game objects was displayed and the value of the counter 620 was adjusted accordingly. In this case, when a user input associated with a game object of the set of activatable game objects is made, it may therefore be determined on the basis of this comparison to modify the value of the first parameter. Since the value of the first parameter is modified, when the user clicks the game objects 1100*a*, 1100*b*, 1100*c*, 1100*d*, and 1100*e* of the set of activatable game objects, game objects 710 of the set of collectable game objects will be displayed and obtained on those occasions when the value of the first parameter is equal one of the predefined set of values.

By determining whether or not to present objects of the set of collectable game objects on the basis of the order of occurrence of previous events, some embodiments may provide a means of implementing the bonus gaming function in the context of the main game, so that the gaming function and the gaming functions of the main game interact in such a way as to be engaging and rewarding to players so as to provoke repeat play.

In one embodiment, the player is presented with a challenge to obtain a certain number of gold bars 710 before the time limit 620 is reached.

Figure 12:
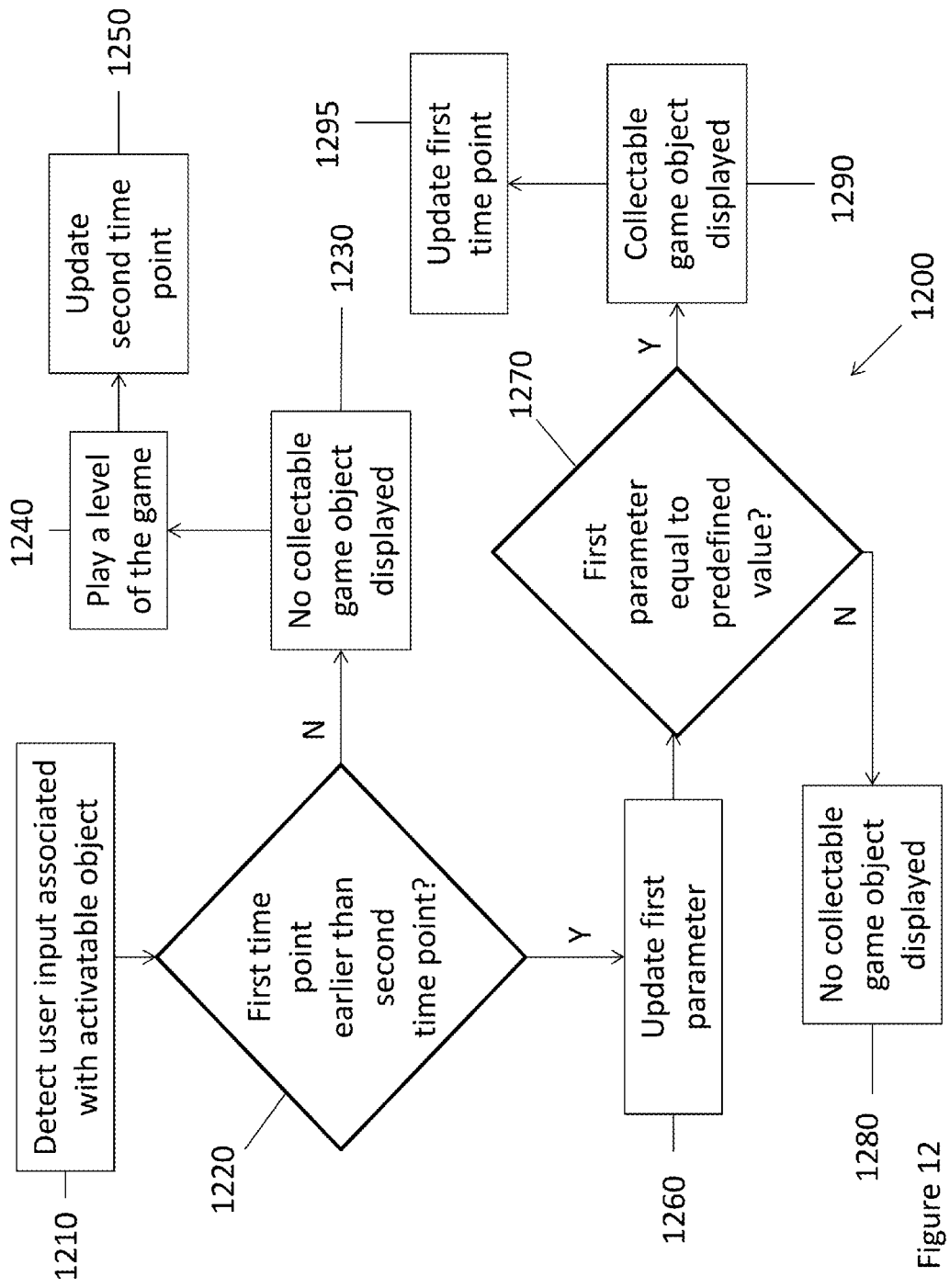
FIG. 12 illustrates a flowchart of a method according to an embodiment.

FIG. 12 shows a method that may be used to determine whether or not to display the collectable game objects on the screen and to increase a count of these objects stored in association with the user account.

At step 1210, a user input may be made at input device 165. The input is associated with one of the game objects of the set of activatable game objects and may, for example, involve a user clicking one of the activatable game objects using a mouse cursor, or pressing on a touch screen at the location of one of the activatable objects or any suitable input. The input device 165, which may be a touch screen, mouse or other input device, detects user input and transmits a signal comprising parameters describing this user input to a processor. Said parameters may comprise parameters specifying the location on the display associated with the user input. The processor may then compare these parameter specifying the location of the user input to the locations of the game objects of the set of activatable game objects, which may be retrieved from the memory 120. If the processor determines that the location of the user input occurs at the location of one of the game objects of the set of activatable game object then the method proceeds to step 1220.

At step 1220, the processor 115 may then proceeds to retrieve from a memory 120 of the device 100, the first time point, which represents the time at which a game object of the set of collectable game objects was last displayed and counted (i.e. collected), and the second time point, which represents the time at which a user last played a level of the game. The first time point may also be defined as the time point at which the first parameter last became equal to one of the set of predefined values. The processor 115 makes a comparison between the first time point and the second time point in order to determine which of the two time points is earlier in time. If the second time point is determined to be earlier, the method then moves on to step 1230.

In one case, it may be that when the processor 115 attempts to retrieve the first time point and the second time point, one or both of these time points cannot be found in the memory 120. This may occur for example, because the user has not yet played a level of the game and/or because a collectable game object 710 has not yet been displayed such that the count 620 of collectable objects 710 is zero. If the processor 115 determines that a first time point is not stored in the memory 120 then the method may proceed to step 1260. If the processor 115 determines that a second time point is not stored in the memory 120, but that a first time point is stored in the memory 120, then the method may proceed to step 1230.

At step 1230, the user input does not cause a game object of the set of collectable game objects 1230 to be displayed and the count 620 remains unadjusted.

At step 1240, the user may choose to play a level of the game.

At step 1250, upon completion of the level of the game, the processor 115 may determine the time of completion of the level of the game and updates the second time point stored in the memory 120 of the device 100 with this time of completion. If a value of the second time point is not yet stored in the memory 120, e.g. because the completed level is the first level the user has played, the processor 115 may reserve a location in the memory 120 for the second time point and store it in that location of the memory 120, said second time point having the value of the time of completion of the level.

In one embodiment, the processor 115 may determine the time of completion of the level from an internal clock of the device 100. In another embodiment, the time value may be received from the server 220.

In one embodiment, instead of updating the second time point with the time of completion of the level, another time associated with the time period during which the level is being played may be used. For example, the time at which the user started playing the level may be used. In this case, the processor 115 may update the value of the second time point stored in the memory when the user initiates play of the level prior to the level's completion.

Returning to step 1220, if the processor 115 instead determines that the first time point is earlier than the second time point then the method proceeds to step 1260.

At step 1260, the processor 115 retrieves the value of a first parameter updates the value of the first parameter and stores the updated value in the memory 120. In one embodiment, updating the first parameter may involve increasing the value of the first parameter by a value of one. In this case, the value of the first parameter may start at 0 and proceed to increase in the sequence: 1, 2, 3, 4, 5. Each time the value of the first parameter is modified the value is modified the method proceeds to step 1270.

At step 1270, the processor 115 may retrieve a set of predefined values stored in the memory 120 of the device 100, and compare the new value of the first parameter to this set of predefined values to determine whether or not the first parameter is equal to any of the predefined values.

In one embodiment, the set of predefined values may be downloaded from the server 220 and stored in the memory 120 when the set of activatable game objects is initially downloaded through the WAN 150 from the server 220. A downloaded data file comprising the parameters defining the characteristics of the activatable game objects may also comprise said predefined values and may be received at the device 100 when the time-variant parameter falls within the range indicating the activatable game objects are to be displayed. These predefined values may be stored alongside the activatable game objects in the memory 120.

In another embodiment, the set of predefined values may not be stored in the memory 120 of the device 100. In this case, when the value of the first parameter is modified at the device, the new value of the first parameter may be transmitted through the network interface 145 to the server 220. The server 220 may retrieve the set of predefined values from, for example, the database 250, and compare the first parameter to the set of predefined values to determine whether or not the first parameter is equal to one of the set of predefined values. The server may respond to the result of the comparison by transmitting a signal across the network 210 to the device indicating whether or not the first parameter is equal to one of the predefined values.

If the first parameter after being modified is not equal to one of the predefined values, the method proceeds to step 1280.

At step 1280, no collectable game object 710 is displayed on the screen as a result of the user input. The count 620 remains unmodified. The user may then continue to make input associated with the set of activatable objects in order to modify the value of the first parameter until it equals one of the values of the set of predefined values.

If the first parameter after being modified is equal to one of the predefined values, the method then proceeds to step 1290.

At step 1290, the parameters specifying the appearance of the collectable game objects may be retrieved from the memory 120, and used by the processor 115 to display the collectable game object 710 on the display 155. The processor may also modify the value of the count 620 stored in the memory 120, and update the value of the count 620 which is shown on the display 155. The count 620 may be updated by increasing its value by one so as to indicate that one more game object of the set of collectable game objects has been collected.

In one embodiment, the set of parameters specifying the characteristics, such as the appearance, of the collectable game objects may be downloaded from the server 220 and stored in the memory 120 when the activatable game objects is initially downloaded through the WAN 150 from the server 220. A downloaded data file comprising the parameters defining the characteristics of the activatable game objects and the parameters defining the characteristics of the collectable game objects may be received at the device 100 when the time-dependent parameter falls within the range indicated the activatable game objects are to be displayed. The collectable game objects may be stored alongside the activatable game objects in the memory 120.

In another embodiment, the set of parameters specifying the characteristics, such as the appearance, of the collectable game objects may be downloaded from the server 220 when the first parameter is determined to be equal to one of the set of predefined values. As discussed above, when the first parameter is modified, its new value may be transmitted to the server 220 and compared to the set of predefined values. Additionally or alternatively to transmitting the result of the comparison by transmitting a signal across the network 210 to the device 100 indicating whether or not the first parameter is equal to one of the predefined values, the server 220 may transmit the parameters specifying the characteristics of the collectable game objects. This transmission of the parameters specifying the characteristics of the collectable game objects may occur the first time the first parameter becomes equal to one of the set of predefined values and the parameter may be stored in the memory 120 of the device 100 for future use. Alternatively, the transmission of parameters specifying the characteristics of one or more of the collectable game objects may occur each time the first parameter becomes equal to one of the set of predefined values.

At step 1295, upon displaying one of the game objects of the set of collectable game objects 710 and updating the count 620, the processor determines the time of display of the game object 710 and updates the first time point stored in the memory 120 of the device 100 with the time of display. If the displayed collectable object 710 is the first to be displayed of the set of collectable game objects, the processor 115 may create the first time point and store it in memory 120, giving it the value of the time of display of the collectable object 710.

At step 1280, no collectable game object 1210 is displayed on the screen as a result of the modification of the value of the first parameter 710. The user may then continue to make input associated with the set of activatable objects, in order to modify the value of the first parameter until it equals the one of the set of predefined values.

Figure 13:
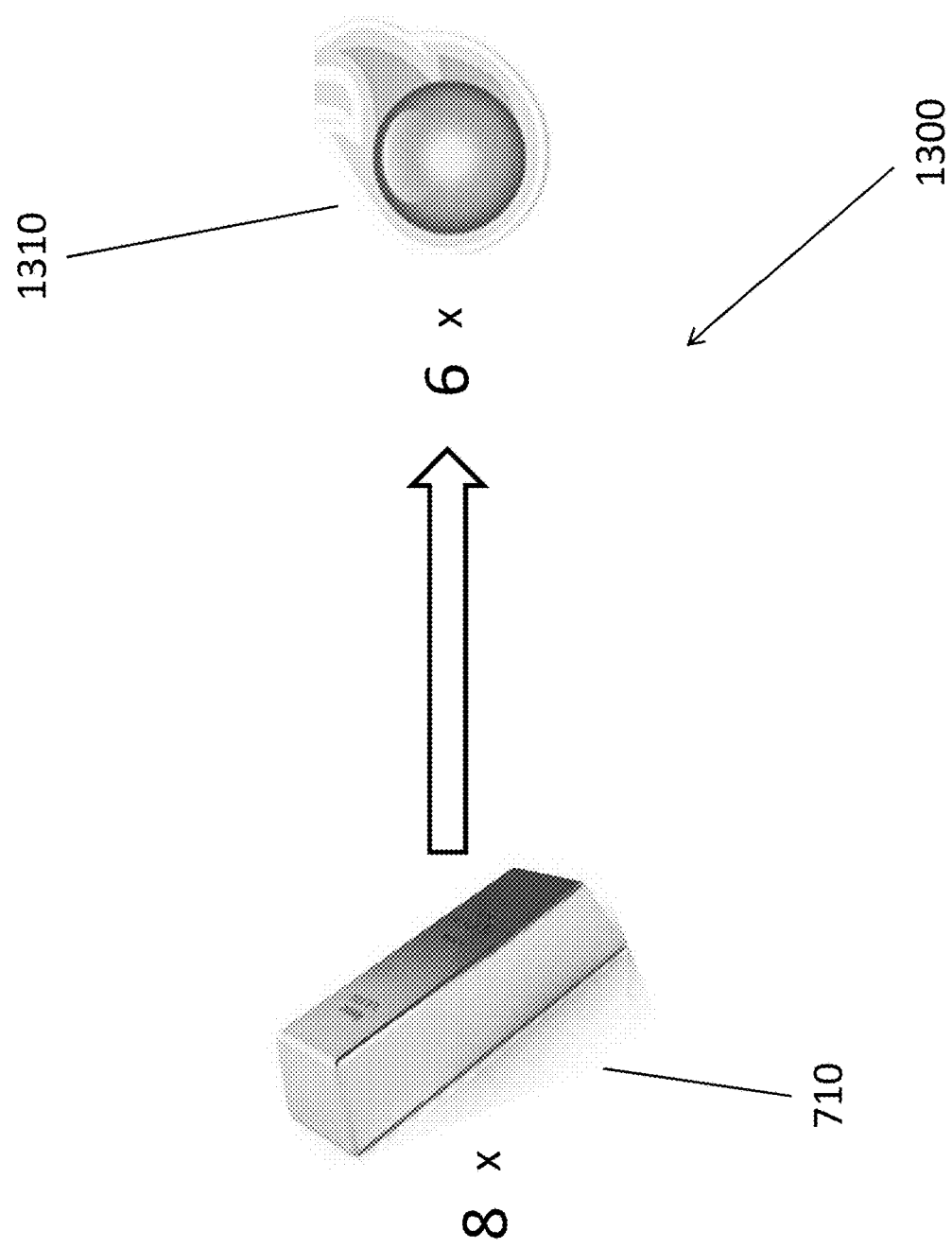
FIG. 13 shows how collecting the collectable game objects may result in a reward.

FIG. 13 indicates an example of a possible reward game object 1310 that may be displayed when the count 620 of the number of game objects of the set of collectable game objects has reached a predefined reward value. In this embodiment, the reward game object takes the form of a 'Papa pear' booster 1310. In this case, once the count has reached a value indicating that the player has obtained eight gold bars 710 the player receives a reward of six 'Papa Fire' boosters 1310.

As with the set of collectable game objects, the data defining the characteristics of the reward game object may not be stored at the user device before the count has reached the predefined reward value. In this case, the count 610 may transmitted to the server 220, the server in response being configured to transmit the reward game object to the user device if the count has reached the predefined reward value.

When the reward game object is displayed, this object may become associated with the user's account, such that the reward game object is part of their inventory. When the user then logs into the game on future occasions, the game progress data will be loaded including data specifying the presence of the reward game object in the player's inventory. If the reward game object takes the form of a booster such as the 'Papa Fire' booster 1310, this object can then be utilised during gameplay as will be explained.

Figure 14:
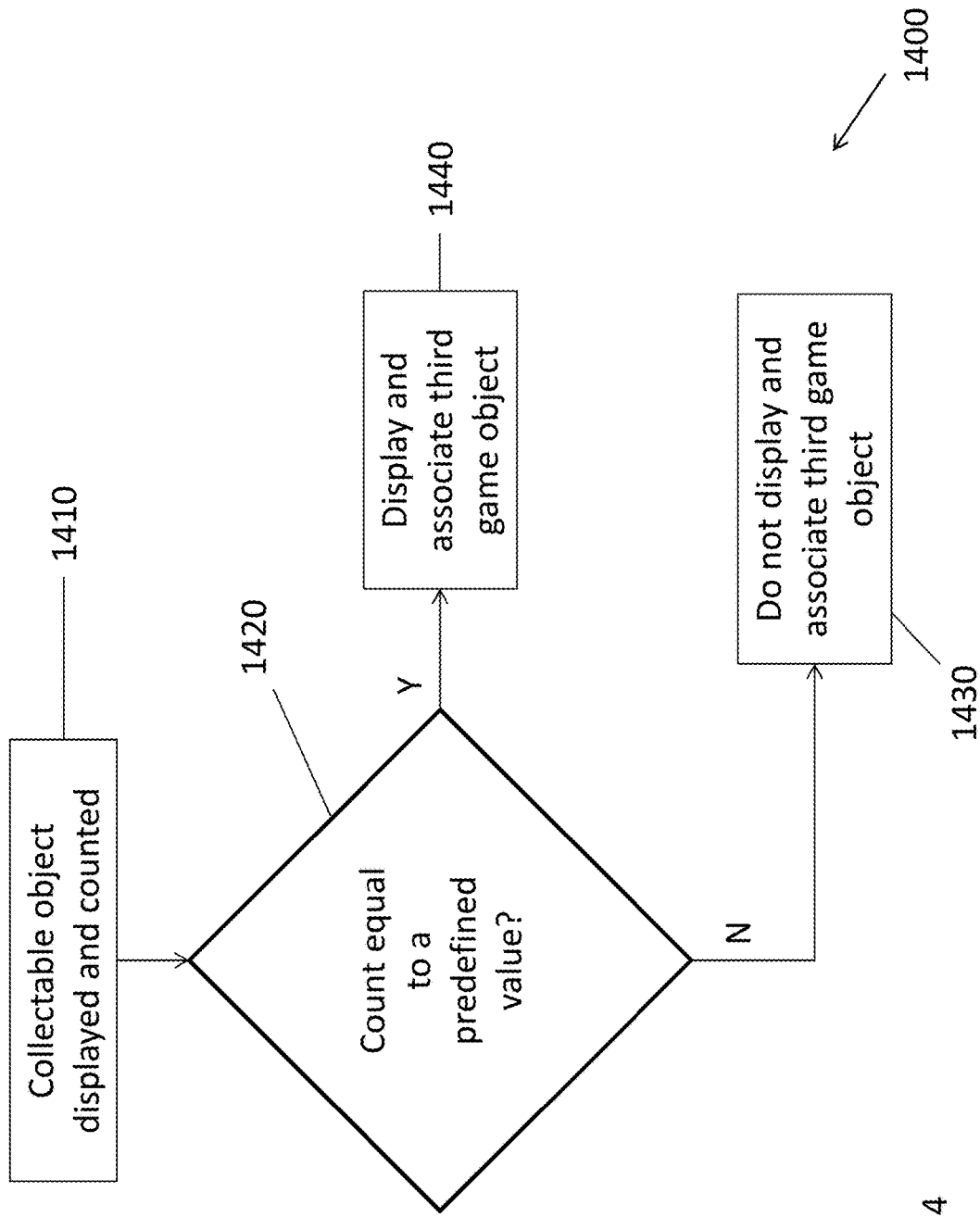
FIG. 14 illustrates a flowchart of a method according to an embodiment.

FIG. 14 shows a method that may be used to determine whether or not to display a reward game object on the screen and to increase a count of these objects stored in association with the user account.

At step 1410, a game object 710 of a set of collectable game objects is displayed at display 155, and the processor 115 causes a count 620 stored in memory 120 and shown on display 155 to increase. The method used to achieve this was described with regard to FIG. 12, particularly in step 1290 of that method.

At step 1420, the processor may retrieve a predefined reward value stored in the memory 120 of the device 100, and compare the new value of count 620 of collectable objects 710 to this predefined reward value to determine whether or not the count 620 is equal to the predefined reward value.

In one embodiment, the predefined reward value may be downloaded from the server 220 and stored in the memory 120 when the activatable game object is initially downloaded through the WAN 150 from the server 220. A downloaded data file comprising the parameters defining the characteristics of the activatable game objects may also comprise said predefined reward value. The data file may be received at the device 100 when the time-dependent parameter falls within the range indicating that the activatable game objects are to be displayed or at another time. The predefined reward value may be stored alongside the activatable game objects in the memory 120.

In another embodiment, the predefined reward value may not be stored in the memory 120 of the device 100. In this case, when the value of the count 620 is updated at the device 100, the new value of the count 620 may be transmitted through the network interface 145 to the server 220. The server 220 may retrieve the predefined reward value, from for example the database 250, and compare the count 620 to the predefined reward value to determine whether or not the count 620 is equal to the predefined reward value. The server 220 may respond to the result of the comparison by transmitting a signal across the network 210 to the device 100 indicating whether or not the count 620 is equal to the predefined reward value.

If the count 620 after being modified is not equal to the predefined reward value, the method proceeds to step 1430, wherein the reward game object is not displayed in response to the change in the value of the count 620. Also there is no modification of the game progress information so as to associate a specific quantity of reward game objects with the user's account so that the reward game object is added to the player's inventory.

At step 1440, parameters specifying the appearance of the reward game object may be retrieved from the memory 120, and used by the processor to show the reward game object 710 on the display 155. The processor may also update the memory 120 to provide a record that the reward game object has been obtained. Additionally or alternatively, the processor may transmit a message through the WAN 150 to the server 220 indicating that the count 620 is equal to the predefined reward value, wherein the message also comprises user account identification information. The server 220 may receive the message, and use the user account identification information contained in the message as a key to locate the game progress information stored in database 250. When located the game progress information can be overwritten to record an increase the quantity of reward game objects associated with the user account. In one embodiment, the server 220 may have access to the social network 230 through network 210 and may associate a specific quantity of reward game objects with a player's social network account. The presence of the reward game object in an inventory of the player may be indicated in game progress information associated with the user's social network account, said game progress information may be stored in database 250 or database 260 and associated with social network account Identification information. It would be understood by the person skilled in the art that the use of a social network account is by way of example only and that any other account wherein game progress information is associated with account identification information may be used.

In another embodiment, the game progress information may be stored locally at the memory 115, so that at step 1440 when the reward game object is displayed, the memory 120 may be updated to provide an updated quantity of reward game objects in the player's inventory.

In one embodiment, the set of parameters specifying the characteristics, such as the appearance, of the reward game object may be downloaded from the server 220 and stored in the memory 120 when the activatable game objects is initially downloaded through the WAN 150 from the server 220. A downloaded data file comprising the parameters defining the characteristics of the activatable game objects and the parameters defining the characteristics of the reward game object may be received at the device 100 when the time-variant parameter falls within the range indicating that the activatable game objects are to be displayed or at another time. The parameters specifying the characteristics of the reward game object may be stored alongside the parameters specifying the characteristics of the activatable game objects in the memory 120.

In another embodiment, the set of parameters specifying the characteristics, such as the appearance, of the reward game object may be downloaded from the server 220 when the count is determined to be equal to the predefined reward value. As discussed above, when the count 220 is modified, its new value may be transmitted to the server 220 and compared to the predefined reward value. Additionally or alternatively to transmitting the result of the comparison by transmitting a signal across the network 210 to the device indicating whether or not the count 620 is equal to the predefined reward value, the server 220 may also transmit the parameters specifying the characteristics of the reward game object.

An embodiment of the 'Papa Fire' booster 1310 will now be explained with reference to FIGS. 3, 15, and 16. If, whilst playing the level shown in FIG. 3, the player is in possession of a 'Papa Fire' booster 1310, they can activate the booster to transform the projectile 320 into a fireball object. A possible result of this transformation is shown in FIG. 13, where the fireball object 1510 now occupies the position previously occupied by the regular projectile 320 as shown in FIG. 3. FIG. 16 shows the image displayed of a level where the fireball object 1510 of FIG. 13 has been fired from the barrel 330 by player input. The fireball object 1510 may possess certain advantages over the regular projectile 320. For example, the fireball object 1510 may destroy the game objects 310 in one hit, whereas some of the objects 310 normally require multiple hits to be destroyed. In another embodiment, whenever the fireball object 1510 makes contact with an object, it may destroy all objects 310 within a certain impact radius.

Even though a 'Papa Pear' booster 1310 has been given as an example of a reward game object that may be displayed to the user device 100 and a quantity of which may be associated with user account identification information once the player has collected a certain required number of game objects of the set of collectable game objects, it will be appreciated by the person skilled in the art that there are many different types of reward that may be presented to the player. As examples only, the reward game object may take the form of in-game currency, a new unlockable level, a special game mode, a set of extra lives, etc.

In one embodiment, the number of game objects of the set of collectable game objects that users may collect is unlimited, i.e. game objects 710 of the set of collectable game objects will continue to be obtainable by the player until the time-dependent parameter possess a predefined value, e.g. a value indicating that the Easter period is over, as long as the player continues to play levels in order to refresh the game map 500. In an alternative embodiment, the number of game objects of the set of collectable game objects that are collectable is limited. It may be the case that the set of activatable game objects continues to be present on the game map but that clicking on the game objects will not reveal any present any more game objects 710 of the set of collectable game objects. In one case, when the value of the first parameter is equal to largest of the predefined values, i.e. all of the gold bars have been received, the set of activatable game objects will cease to be displayed, I.e. the eggs will no longer appear on the game map even if the Easter period is not over and the player continues to play levels of the game.

In one embodiment, the server 220 may supply information to the user device 100 informing the user as to how many game objects of the set of collectable game objects remain to be found.

Figure 17:
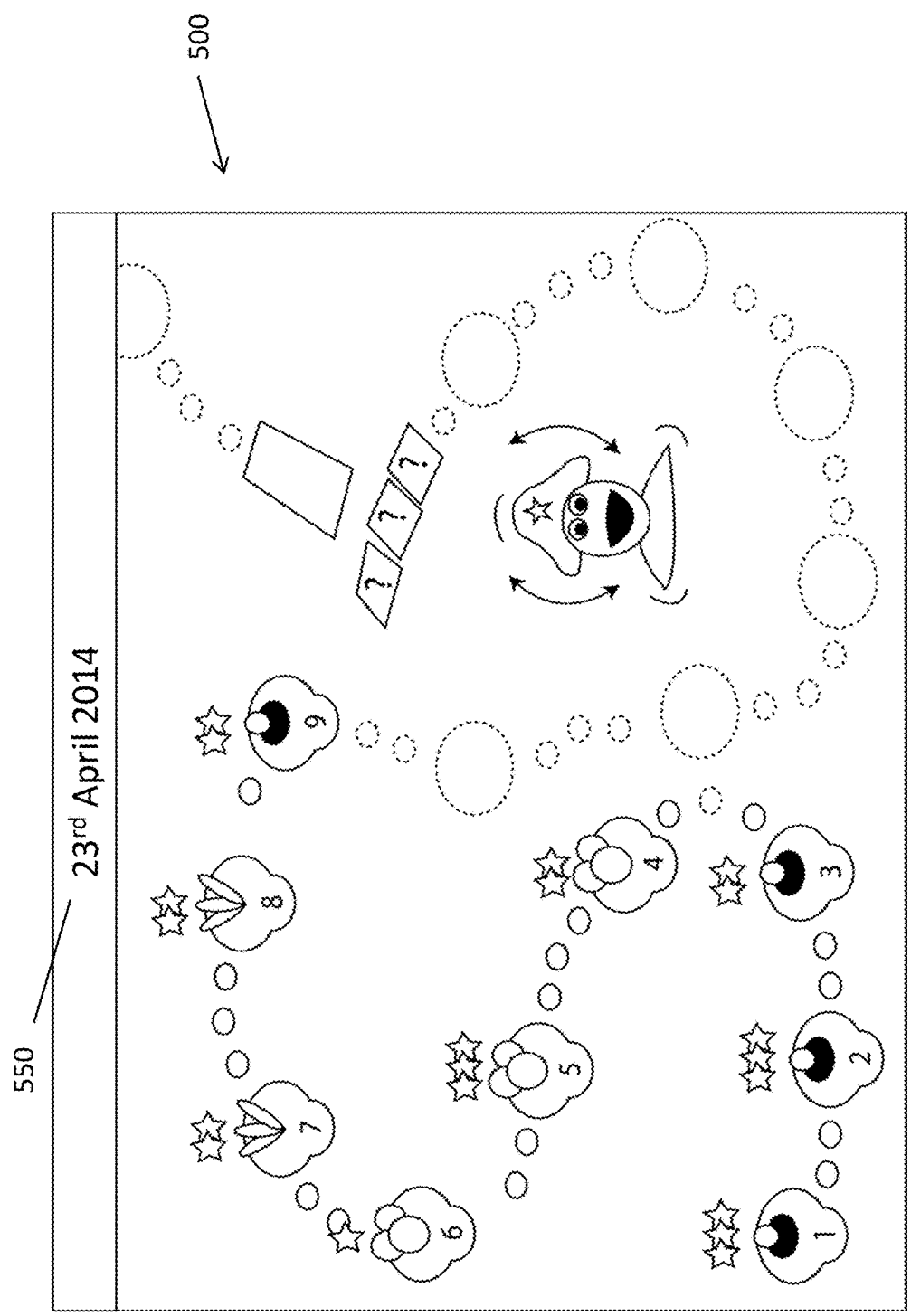
FIG. 17 depicts an example game screen outside of the seasonal period according to an embodiment.

FIG. 17 shows an embodiment of the game map 500 after the Easter period is over. In this case, the set of activatable game objects is no longer displayed on the game map 500 even if not all of the game objects of the first set had been removed, and the time limit 630 had not yet been reached. In an alternative embodiment, the game objects of the set of activatable game objects may continue to be present on the game map 500 regardless of the value of the time-dependent parameter, i.e. even after the Easter period has ended, provided that not all of them have been removed via player input and the time limit has not yet been reached.

Figure 15:
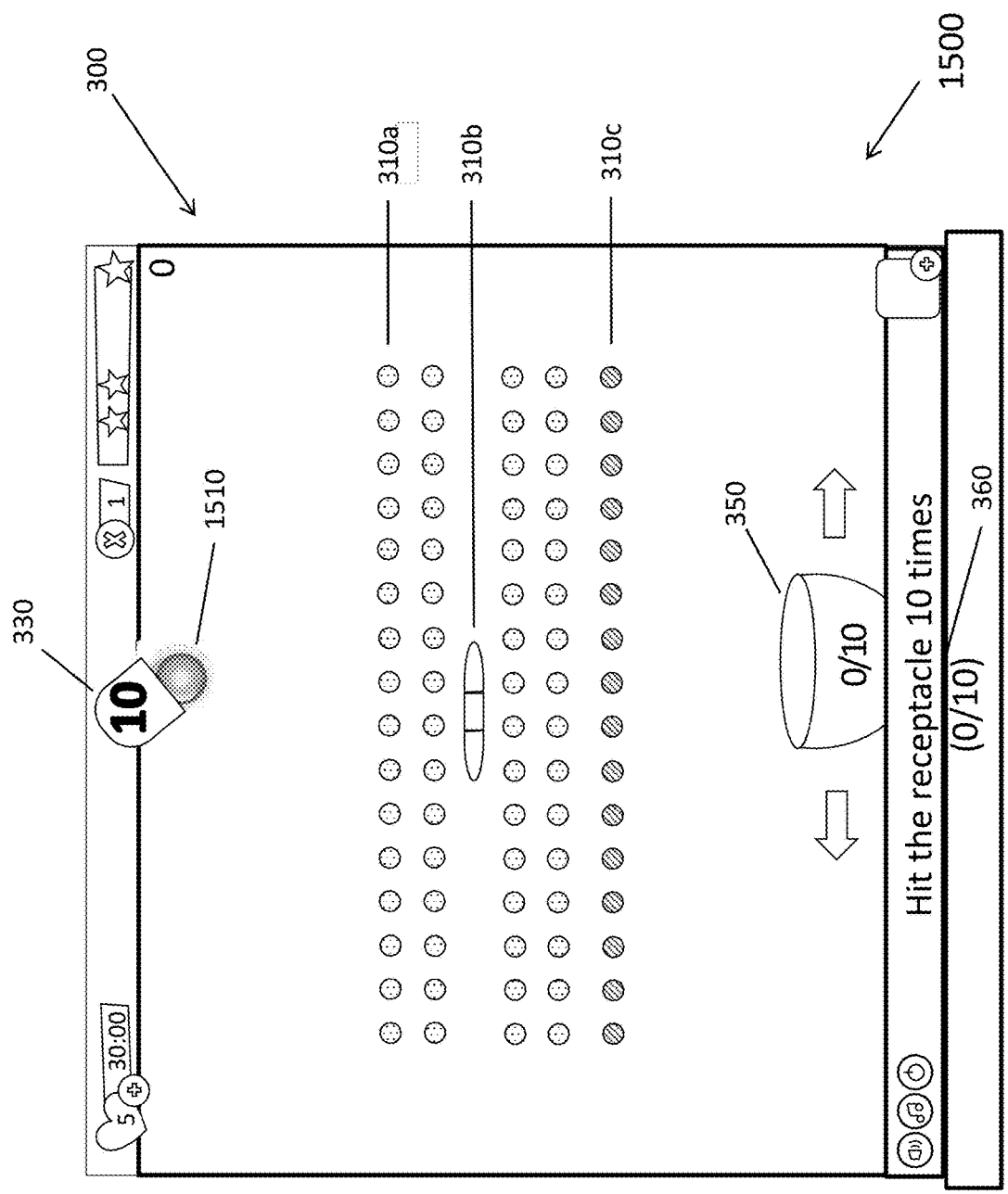
FIG. 15 depicts an example game screen demonstrating the use of a reward object.
Figure 16:
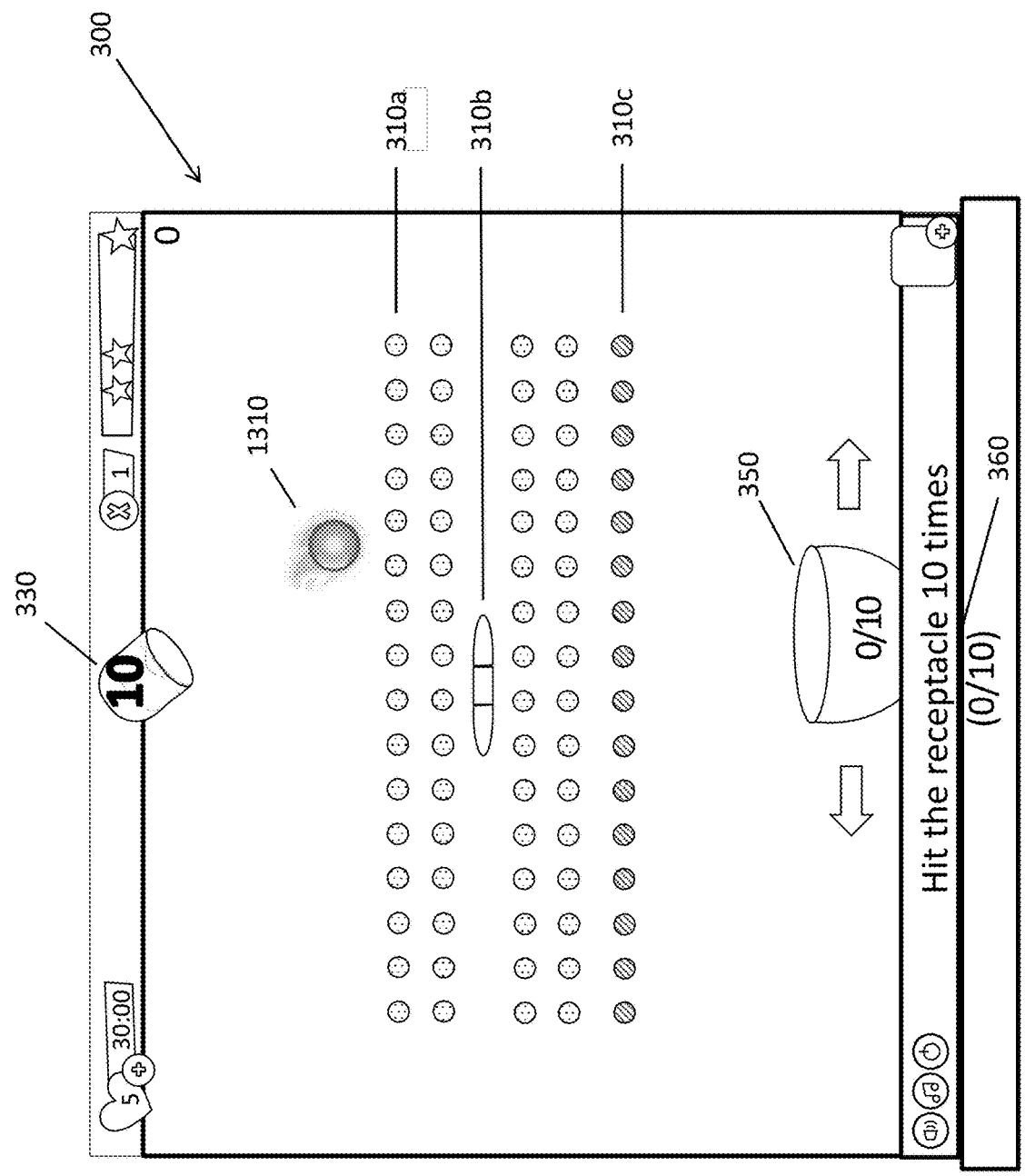
FIG. 16 depicts an example game screen demonstrating the use of a reward object.

In one embodiment, if the time limit is reached during the Easter period, the set of activatable game objects may be removed from the game map 500 and the game map 500 will be returned to its regular state as shown in FIG. 15. In this state, the time-dependent parameter is such that no display of the game objects of the set of activatable game objects from the database 250 to the device 100 is triggered.

Figure 18:
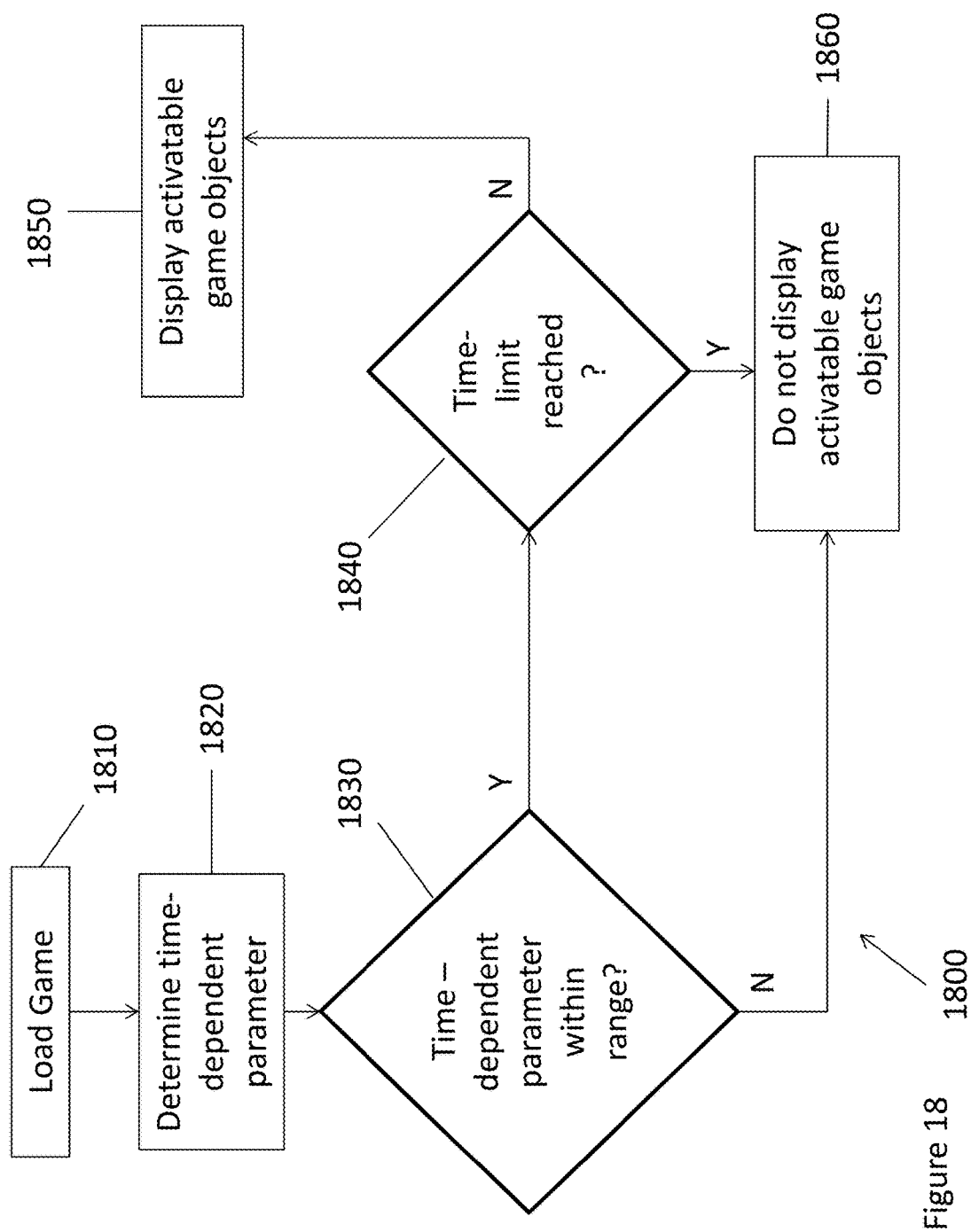
FIG. 18 illustrates a flowchart of a method according to an embodiment.

FIG. 18 shows a method 1800 that may be used to determine whether to display at least a portion of the set of activatable game objects on the game map.

At step 1810, the game is loaded in response to user input. This may involve loading from the memory 115 or from a remote server 220 the necessary data defining the game mechanics and the characteristics of the game objects.

In one embodiment, step 1810 may consist of loading or refreshing a particular aspect of the game, such as the game map.

At step 1820, the processor 115 checks the value of a time-dependent parameter which may be stored in the memory 120 of the device. The value of this time-dependent parameter may be continuously updated by the processor 115 itself or by another clock which may or may not be part of the device 100.

At step 1830, the time-dependent parameter is compared to a range of values for which at least one of a set of activatable game objects should be shown on display 155. The data values which define this range may be stored in the memory 120 and the processor 115 may compare the value of the time-dependent parameter to this range of values to determine whether or not the time-dependent parameter possesses a value within this range. If the value is within the range, the processor may then signal the server 220 through the WAN 150 to transmit the parameters specifying the characteristics of the set of activatable game objects.

In another embodiment, the server 220 may store and/or update the value of the time-dependent parameter itself. Alternatively or additionally, the processes of storing and/or updating the value of the time-dependent parameter may be carried out at another apparatus to which the server 220 has access, such as a database 250. The server 220 and/or database 250 may also store data values defining the range of values within which the activatable game objects should be displayed on the display 155. The server 220 may check the value of the time-dependent parameter and determine when it lies within the range of values. When the server 220 determines that the time-dependent parameter lies within the range, the server 220 may transmit a message to the device 100 through network 210 indicating that at least a portion of the set of activatable game objects are to be displayed on display 155. In one embodiment, the message transmitted from the server may comprise a set of parameters defining the characteristics of the activatable game objects, such as appearance and response to user input. In other embodiment these parameters may already be stored in the memory 120 at the user device 100 and, therefore, it may not be necessary for the server 220 transmit the parameters to the device 100.

Furthermore, when it is first determined that the time-dependent parameter is within the range of values within which the activatable game objects are to be displayed, a countdown is initiated, wherein the processor defines in memory 120 or elsewhere a time value, whose value decreases over time. An example of this countdown value 630 is shown in FIGS. 6 to 11. The value of the countdown may be continuously updated by the processor 115 itself or by another clock which may or may not be part of the device 100.

If the time-dependent parameter falls within the range, the method proceeds to step 1840.

At step 1840, the processor 115 checks the value of the countdown stored in memory 120 or elsewhere to determine whether or not the time-limit has been reached. The limit, for example, may be reached when the value of the countdown reaches zero.

If the time-limit has not been reached, the method proceeds to step 1850, wherein the processor 115 then retrieves from memory 120 or elsewhere the value of the first parameter and the set of predefined values and compares them. If the value of the first parameter is equal to the largest of the set of predefined values, thus indicating that each game object of the set of collectable game objects has been displayed and collected, then the method proceeds to step 1870. Otherwise the method proceeds to step 1860.

At step 1860 activatable game objects are shown on the display 155. The activatable game objects may remain on the screen until removed by user input or until the game or an aspect of the game, such as the game map, is refreshed thus repeating step 1810. If step 1810 is repeated, the rest of method 1800 will have to be repeated so as to determine whether or not to display the activatable game objects.

As already noted when the game is launched, the data required for displaying and defining the characteristics of the set of activatable game objects may not be part of the game which the user device downloads. This additional game data may, therefore, need to be downloaded from the server 220 at step 1870.

If either the time-dependent parameter lies outside the range, the time-limit has been reached or the first parameter is equal to the largest of the set of predefined values, the method then proceeds to step 1870, wherein the activatable game objects are not shown on the display 155.

A person skilled in the art will realise that the different approaches to implementing the methods and device considerations herein are not exhaustive, and that which is described comprises certain embodiments. It is possible to implement the above in a number of variations without departing from the spirit or scope of the invention.

The invention claimed is:

1. A computer implemented method for controlling a display of one or more first game objects of a computer game, said method being performed in a computing device comprising one or more processors and the display, by executing computer code on said one or more processors to perform the steps of:

displaying on the display of the device a first set of one or more first game objects on a level selection screen, said level selection screen allowing a user to select via a user interface one of a plurality of different levels of the computer game from the plurality of different levels displayed on said level selection screen, wherein selection of said level causes a game level screen to be displayed to allow said user to play that level;

in response to user interaction via the user interface with one or more of said one or more first game objects which are displayed on said level selection screen, accumulating one or more collectable game objects without leaving said level selection screen, said one or more collectable game objects comprising or associated with said one or more first game objects; and displaying on said display a second set of one or more of said first game objects on said level selection screen, wherein at least one collectable game object from said second set is accumulatable by user interaction via the user interface with one or more of said first game objects of the second set, and wherein said second set is only provided if the user has played at least one level of said computer game since accumulating one or more of said collectable game objects from said first set.

2. The computer implemented method of claim 1, further comprising:

determining if a number of said collectable game objects accumulated has reached a predetermined value, wherein the step of displaying on said display said second set of one or more of said first game objects is performed in response to said determine.

3. The computer implemented method of claim 2 wherein said predetermined value is a total number of collectable game objects to obtain a reward and if said number of collectable game objects is less than said total number of collectable game objects, displaying on said display said second set of one or more of said first game objects from which at least one collectable game object is accumulatable only if at least one game condition is satisfied.

4. The computer implemented method of claim 3, wherein said at least one game condition is satisfied if a user has played a level of the game.

5. The computer implemented method of claim 2, wherein in dependence upon the value of a first parameter a collectable game object of said collectable game objects is accumulated at a first time point.

6. The computer implemented method of claim 5, further comprising the steps of: determining a second time point at which the user last played a level of the game; and in response to said user interaction via said user interface of the device, modifying the value of said first parameter in dependence upon a comparison between the first time point and the second time point.

7. The computer implemented method of claim 6, wherein in response to said user interaction via said user interface, the value of the first parameter remains unmodified if the first time point is later than the second time point.

8. The computer implemented method of claim 6, wherein in response to said user interaction via said user interface, the value of the first parameter increases if the first time point is earlier than the second time point.

9. The computer implemented method of claim 5, wherein in response to the modification of the value of said first parameter, the value of said first parameter is transmitted to a server, said server is configured to transmit a collectable game object of said one or more collectable game objects to said device in dependence upon the value of said first parameter.

10. The computer implemented method of claim 5, wherein a collectable game object of said one or more collectable game objects is accumulated if the first parameter is equal to one of a set of predefined values.

11. The computer implemented method of claim 10, wherein when the first parameter is equal to the largest of the set of predefined values, said first game objects are not displayed.

12. The computer implemented method of claim 1, wherein said collectable game objects are obtained responsive to interaction with said first game objects.

13. The computer implemented method of claim 12, wherein said one or more first game objects comprise one or more activatable game objects.

14. The computer implemented method of claim 1, wherein when said number of said collectable game objects accumulated has reached a predetermined reward value a reward game object is accumulated.

15. The computer implemented method of claim 1, wherein in response to input received via the user interface, interaction with a given plurality of first game objects is configured to accumulate a collectable game object.

16. The computer implemented method of claim 15, wherein when a given number of collectable game objects is accumulated, another second set of first game objects from which a further collectable game object is accumulatable is displayed only if at least one game condition is satisfied.

17. The computer implemented method of claim 1, wherein said first game objects are displayed in dependence upon a time-dependent parameter.

18. The computer implemented method of claim 1, comprising determining a number of first game objects which have been displayed and only displaying said second set of first game objects if the number of first game objects displayed is less than a maximum number of first game objects.

19. The computer implemented method of claim 1, further comprising:
determining if a time-dependent parameter is equal to a predetermined value, wherein said time-dependent parameter is calendar dependent.

20. The computer implemented method of claim 19, wherein if said time-dependent parameter is equal to said predetermined value, causing said displaying on the display of the device said one or more first game objects.

21. The computer implemented method of claim 1, wherein the plurality of different levels are displayed on a progression path.

22. The computer implemented method of claim 1, wherein the plurality of different levels constitute a saga game.

23. A device having:
a display;
a user interface, said user interface being configured to receive user input;
at least one processor; and
at least one memory, said at least one processor configured to cause:
displaying on said display of the device a first set of one or more first game objects on a level selection screen, said level selection screen allowing a user to select via a user interface one of a plurality of different levels of the computer game from the plurality of different levels displayed on said level selection screen, wherein selection of said level causes a game level screen to be displayed to allow said user to play that level;
in response to user interaction via the user interface with one or more of said one or more first game objects which are displayed on said level selection screen accumulating one or more collectable game objects without leaving said level selection screen, said one or more collectable game objects comprising or associated with said one or more first game objects; and
displaying on said display a second set of one or more of said first game objects on said level selection screen, wherein at least one collectable game object from said second set is accumulatable by user interaction via the user interface with one or more of said first game objects of the second set, and wherein said second set from which at least one collectable game object is only provided if the user has played at least one level of said computer game since accumulating one or more of said collectable game objects from said first set.

24. A computer readable storage device storing program code instructions that, when executed by at least one processor cause:
displaying on a display of the device a first set of one or more first game objects on a level selection screen, said level selection screen allowing a user to select via a user interface one of a plurality of different levels of the computer game from the plurality of different levels displayed on said level selection screen, wherein selection of said level causes a game level screen to be displayed to allow said user to play that level;
in response to user interaction via the user interface with one or more of said one or more first game objects which are displayed on said level selection screen, accumulating one or more collectable game objects without leaving said level selection screen, said one or more collectable game objects comprising or associated with said one or more first game objects; and
displaying on said display a second set of one or more of said first game objects on said level selection screen, wherein at least one collectable game object from said second set is accumulatable by user interaction via the user interface with one or more of said first game objects of the second set, and wherein said second set from which at least one collectable game object is only provided if the user has played at least one level of said computer game since accumulating one or more of said collectable game objects from said first set.

25. A server in communication with a user device, said server configured to:
receive from said user device a message indicating user input via a user interface;
in response to said message transmit a collectable game object of a set of collectable game objects to said user device, said collectable game objects comprising or associated with a first set of first game objects displayed on a display of said device on a level selection screen, said level selection screen allowing a user to select via a user interface one of a plurality of different levels of a computer game from the plurality of different levels displayed on said level selection screen, wherein selection of said level causes a game level screen to be displayed to allow said user to play that level; and
signaling the user device to display a second set of one or more of said first game objects on said level selection screen, wherein at least one collectable game object from the second set is accumulatable by user interaction via the user interface with one or more of said first game objects of the second set, wherein said second set is only provided if the user has played said computer game since accumulating one or more of said collectable game objects from said first set.

26. A computer implemented method for controlling the exchange of game objects between a database and a user device comprising: a user interface, at least one memory, and at least one processor in connection or communication with at least one memory, the method comprising the steps of:
- receiving from said user device a message indicating user input via said user interface;
- in response to said message transmitting a collectable game object of a set of collectable game objects to said user device, said collectable game objects comprising or associated with a first set of one or more first game objects displayed on a display of said device on a level selection screen allowing a user to select via a user interface one of a plurality of different levels of a computer game from the plurality of different levels displayed on said level selection screen, wherein selection of said level causes a game level screen to be displayed to allow said user to play that level; and
- signaling the user device to display a second set of one or more of said first game objects on said level selection screen, wherein at least one collectable game object from said second set is accumulatable by user interaction via the user interface with one or more of said first game objects of the second set, wherein said second set is only provided if the user has played said computer game since accumulating one or more of said collectable game objects from said first set.

* * * * *